(12) United States Patent
Li

(10) Patent No.: US 11,876,744 B2
(45) Date of Patent: Jan. 16, 2024

(54) SECONDARY CELL ACTIVATION METHOD, ACCESS NETWORK DEVICE, AND COMMUNICATIONS APPARATUS AND SYSTEM

(71) Applicant: HUAWEI TECHNOLOGIES CO., LTD., Guangdong (CN)

(72) Inventor: Bingzhao Li, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/535,264

(22) Filed: Nov. 24, 2021

(65) Prior Publication Data

US 2022/0085948 A1    Mar. 17, 2022

Related U.S. Application Data

(63) Continuation of application No. 16/784,119, filed on Feb. 6, 2020, now Pat. No. 11,218,264, which is a
(Continued)

(30) Foreign Application Priority Data

Aug. 11, 2017    (CN) .......................... 201710687908.8

(51) Int. Cl.
*H04L 5/00* (2006.01)
*H04W 24/10* (2009.01)
*H04W 72/54* (2023.01)

(52) U.S. Cl.
CPC .......... *H04L 5/0048* (2013.01); *H04W 24/10* (2013.01); *H04W 72/54* (2023.01)

(58) Field of Classification Search
CPC . H04W 72/1226; H04W 24/04; H04W 24/10; H04W 72/12; H04W 16/32;
(Continued)

(56) References Cited

U.S. PATENT DOCUMENTS 9,820,286 B2 *  11/2017  Dalsgaard ............. H04W 72/23
9,924,533 B2 *   3/2018  Tseng ................ H04W 56/0005
(Continued)

FOREIGN PATENT DOCUMENTS

CN         102547841 A      7/2012
CN         104540158 A      4/2015
(Continued)

OTHER PUBLICATIONS

Huawei, HiSilicon, Delay reduction for SCell Activation [online], 3GPP TSG RAN WG2 #99 R2-1708550, Aug. 11, 2017, total 3 pages.
(Continued)

*Primary Examiner* — Man U Phan
(74) *Attorney, Agent, or Firm* — WOMBLE BOND DICKINSON (US) LLP

(57) ABSTRACT

A secondary cell activation method and apparatus relating to the communications field are described herein. The method may include sending, by an access network device, an activation command to a terminal device, where the activation command indicates activating a secondary cell. The method may also include sending, by the access network device, first configuration information of a first reference signal to the terminal device. Furthermore, the method may include sending, by the access network device, the first reference signal to the terminal device according to the first configuration information, where the first reference signal is used to obtain a channel measurement result of the secondary cell. According to secondary cell activation methods described herein, a flexible and efficient secondary cell activation mechanism can be provided, so as to improve secondary cell activation efficiency.

15 Claims, 6 Drawing Sheets

Related U.S. Application Data continuation of application No. PCT/CN2018/096208, filed on Jul. 19, 2018.

(58) Field of Classification Search
CPC ........ H04W 76/27; H04B 17/309; H04L 5/00;
H04L 5/0048; H04L 1/0027
USPC .......................................................... 370/329
See application file for complete search history.

(56) References Cited

U.S. PATENT DOCUMENTS

| | | | |
|---|---|---|---|
| 10,194,336 B2* | 1/2019 | Kazmi | H04W 16/14 |
| 10,212,619 B2* | 2/2019 | Singhal | H04L 5/006 |
| 10,306,537 B2* | 5/2019 | Dinan | H04W 48/08 |
| 10,341,938 B2* | 7/2019 | Dinan | H04L 5/0057 |
| 10,455,635 B2* | 10/2019 | Park | H04W 76/15 |
| 10,674,498 B2* | 6/2020 | Chakraborty | H04L 5/001 |
| 10,728,943 B2* | 7/2020 | Jang | H04W 52/0206 |
| 10,791,512 B2* | 9/2020 | Kadiri | H04W 76/10 |
| 11,025,401 B2* | 6/2021 | Kadiri | H04W 36/0072 |
| 11,197,302 B2* | 12/2021 | Cheng | H04B 7/088 |
| 11,451,359 B2* | 9/2022 | Lin | H04L 1/1812 |
| 2015/0215852 A1 | 7/2015 | Gou et al. | |
| 2015/0257163 A1 | 9/2015 | Dalsgaard et al. | |
| 2015/0327107 A1 | 11/2015 | Kim et al. | |
| 2016/0345194 A1 | 11/2016 | Agyapong et al. | |
| 2017/0005764 A1 | 1/2017 | Park et al. | |
| 2018/0007731 A1 | 1/2018 | Park et al. | |
| 2018/0035323 A1 | 2/2018 | Li et al. | |
| 2019/0021052 A1* | 1/2019 | Kadiri | H04W 52/0206 |
| 2019/0037458 A1* | 1/2019 | Kadiri | H04W 48/12 |
| 2019/0261297 A1 | 8/2019 | Li et al. | |
| 2019/0320379 A1* | 10/2019 | Dinan | H04W 36/04 |
| 2020/0213889 A1* | 7/2020 | Li | H04L 5/0057 |
| 2020/0296657 A1* | 9/2020 | Dinan | H04W 72/0446 |
| 2020/0366450 A1* | 11/2020 | Kazmi | H04L 5/0098 |
| 2020/0374737 A1* | 11/2020 | Dinan | H04L 5/0032 |
| 2021/0251040 A1* | 8/2021 | Tang | H04W 24/10 |
| 2021/0321405 A1* | 10/2021 | Cui | H04W 24/10 |
| 2021/0352750 A1* | 11/2021 | Cheng | H04W 56/0045 |
| 2022/0022067 A1* | 1/2022 | Kim | H04W 24/08 |
| 2022/0046735 A1* | 2/2022 | Wang | H04L 5/0057 |
| 2022/0095125 A1* | 3/2022 | Xiao | H04B 7/022 |
| 2022/0104056 A1* | 3/2022 | Takeda | H04L 5/0051 |
| 2022/0116924 A1* | 4/2022 | Takeda | H04L 5/0098 |
| 2022/0225183 A1* | 7/2022 | Takeda | H04L 5/0048 |
| 2022/0294677 A1* | 9/2022 | Takeda | H04L 5/0048 |
| 2022/0330137 A1* | 10/2022 | Babaei | H04L 5/0098 |

FOREIGN PATENT DOCUMENTS

| | | |
|---|---|---|
| CN | 104995860 A | 10/2015 |
| CN | 105009661 A | 10/2015 |
| CN | 106455040 A | 2/2017 |
| CN | 109565665 B | 9/2021 |
| EP | 3264633 A1 | 1/2018 |
| JP | 2017537489 A | 12/2017 |
| WO | 2013161788 A1 | 10/2013 |
| WO | 2016045620 A1 | 3/2016 |
| WO | 2016117928 A1 | 7/2016 |
| WO | 2016149167 A1 | 9/2016 |
| WO | 2016161625 A1 | 10/2016 |

OTHER PUBLICATIONS

Huawei, HiSilicon, CA initial state in NR [online], 3GPP TSG RAN WG2 adhoc_2017_06_NR R2-1706746, Jun. 17, 2017, total 3 pages.

NTT Docomo, CSI Acquisition Schemes for NR [online], 3GPP TSG RAN WG1 adhoc_NR_AH_1701 R1-1700596, Jan. 10, 2017, total 5 pages.

3GPP TS 36.331 V14.3.0 (Jun. 2017), 3rd Generation Partnership Project; Technical Specification Group Radio Access Network; Evolved Universal Terrestrial Radio Access (E-UTRA); Radio Resource Control (RRC); Protocol specification (Release 14), 745 pages.

3GPP TS 38.211 V0.1.0 (Jun. 2017),3rd Generation Partnership Project;Technical Specification Group Radio Access Network;NR;Physical channels and modulations (Release 15),total 22 pages.

3GPP TSG-RAN WG2 Meeting #98 R2-1704866,CA Activation-Deactivation in NR ,Huawei, HiSilicon,Hangzhou, China, May 15-19, 2017,total 3 pages.

* cited by examiner

SECONDARY CELL ACTIVATION METHOD, ACCESS NETWORK DEVICE, AND COMMUNICATIONS APPARATUS AND SYSTEM

CROSS-REFERENCE TO RELATED APPLICATIONS

This application is a continuation of U.S. patent application Ser. No. 16/784,119, filed on Feb. 6, 2020, now U.S. Pat. No. 11,218,264, which is a continuation of International Application No. PCT/CN2018/096208, filed on Jul. 19, 2018, which claims priority to Chinese Patent Application No. 201710687908.8, filed on Aug. 11, 2017. All of the aforementioned patent applications are hereby incorporated by reference in their entireties.

TECHNICAL FIELD

The present disclosure relates to the communications field, and in particular, to a secondary cell activation method, an access network device, and a communications apparatus and system.

BACKGROUND

Currently, in network deployment of a wireless communications network, a carrier aggregation (CA) technology is used. One access network device may have a plurality of different cells, and a terminal device may be connected to the plurality of different cells of the access network device at the same time. CA means that communication is simultaneously performed on one primary carrier and several secondary carriers instead of only one carrier in a communication process. Cells aggregated by the terminal device having a carrier aggregation function include one primary cell and several secondary cells. In a process of using the secondary cells, the secondary cells may be activated and deactivated according to a requirement. For example, if no data is transmitted between the access network device and the terminal device within a time, the access network device may deactivate a secondary cell. The deactivated secondary cell is not used for data transmission between the access network device and the terminal device. Subsequently, when data needs to be transmitted or a relatively large amount of data is to be transmitted, the access network device activates a secondary cell according to a requirement. The activated secondary cell is used again for data transmission between the access network device and the terminal device. Generally, one cell may be corresponding to one carrier set, and the carrier set includes at least one carrier.

In some approaches, when a terminal device needs to activate a secondary cell, the terminal device needs to send channel state information (CSI) of the secondary cell to an access network device, to activate the secondary cell. The terminal device usually reports CSI of all cells to the access network device through a physical uplink control channel (PUCCH) of a primary cell. Specifically, when the terminal device receives, in a subframe N, a secondary cell activation command sent by the access network device, the terminal device adds the CSI of the activated secondary cell to a CSI report at a preset time (for example, a subframe N+8), and sends the CSI to the access network device. The terminal device may not obtain a valid CSI measurement value from the CSI report to which the CSI is added at the preset time. In this case, the terminal device needs to fill a special measurement value into the CSI, to notify the access network device that the terminal device does not obtain the valid measurement value. The terminal device does not start to fill a normal CSI measurement value until the terminal device starts to obtain the valid CSI measurement value.

Specifically, in a long term evolution (LTE) system, one cell corresponds to one carrier, and cell activation is carrier activation. In response to an activation command of the access network device, the terminal device measures a cell common reference signal (CRS) to obtain CSI, and reports the CSI to the access network device. The measurement may be radio resource management (RRM) measurement. However, in some scenarios, configuration information of a CRS is specified in a protocol, and a sending period and a location are relatively fixed. In addition, the terminal device can receive and measure the CRS only when the terminal device is synchronized with a to-be-activated cell. Consequently, an existing CRS-based activation method is not flexible enough, and has relatively low activation efficiency. In addition, the activation method can be applied only to a system compatible with a CRS, and is not commonly used.

SUMMARY

The present disclosure describes embodiments of a secondary cell activation method, an access network device, and a communications apparatus and system, so that a flexible and efficient secondary cell activation mechanism can be provided.

To achieve the foregoing objective, the following technical solutions are used in the embodiments of the present invention.

According to a first aspect, a secondary cell activation method is provided, including:

sending, by an access network device, an activation command to a terminal device, where the activation command is used to indicate activating a secondary cell;

sending, by the access network device, first configuration information of a first reference signal to the terminal device; and sending, by the access network device, the first reference signal to the terminal device according to the first configuration information, where the first reference signal is used to obtain a channel measurement result of the secondary cell.

According to the method, the access network device may send the first reference signal and the first configuration information of the first reference signal to the terminal device, so that the terminal device performs channel measurement on the first reference signal according to the first configuration information. This solution avoids a scenario in which a secondary cell can be measured and activated based only on a fixedly configured CRS, so as to improve secondary cell activation flexibility, and improve secondary cell activation efficiency.

In an optional design, the first reference signal is located before an available second reference signal of the terminal device in time domain, and the second reference signal is configured by using second configuration information; or the first reference signal is located between two adjacent second reference signals of the terminal device in time domain, and the two adjacent second reference signals are configured by using same second configuration information. According to the method, when there is already the second reference signal configured by using the second configuration information, the first reference signal configured by using the first configuration information can be temporarily sent, so that the terminal device quickly responds to the activation command to measure the secondary cell without affecting current sending of the second reference signal configured by using the second configuration information.

In an optional design, the second reference signal is periodic.

In an optional design, the first reference signal is a synchronization signal SS or a channel state information reference signal CSI-RS.

In an optional design, when the access network device determines that the terminal device is not synchronized with the secondary cell, the reference signal is a synchronization signal. The synchronization signal is configured to perform channel measurement when the secondary cell is activated, so that the terminal device can still quickly perform channel measurement in time and obtain the channel measurement result even if the terminal device is in an out-of-synchronization state. Alternatively, when the access network device determines that the terminal device is synchronized with the secondary cell, the reference signal is a channel state information reference signal. The channel state information reference signal is of relatively sparse distribution on a resource, and occupies a relatively small quantity of resources. Therefore, the channel state information reference signal is configured to perform channel measurement when the secondary cell is activated, so that the access network device can more easily obtain an available resource used to send the first reference signal, and the terminal device can quickly perform channel measurement and obtain the channel measurement result.

In an optional design, the activation command includes the first configuration information; or the access network device sends the first configuration information before the activation command; or the activation command includes a first part of the first configuration information, and the access network device sends a second part of the first configuration information before the activation command.

In an optional design, the first configuration information includes at least one of the following information:
  a reference signal sending indication;
  a reference signal sending time;
  a reference signal period;
  a reference signal time domain resource location;
  a reference signal frequency domain resource location; and
  a reference signal configuration index, where the reference signal configuration index is used to indicate a location of reference signal configuration information.

In an optional design, the reference signal sending time of the first reference signal is a relative time difference between a time at which the access network device sends the first reference signal and a time at which the access network device sends the activation command, or is a time at which the access network device sends the first reference signal.

In an optional design, before the sending, by the access network device, the first reference signal to the terminal device according to the first configuration information, the method further includes: when a difference between the available second reference signal of the terminal device and a current time exceeds a first threshold, determining, by the access network device, to send the first reference signal to the terminal device. The method can avoid a signaling waste caused by still sending the first reference signal when the second reference signal that can be used for channel measurement is sent to the terminal device in a short time after the activation command is sent.

The first threshold is preset, in some embodiments.

In an optional design, the access network device receives the channel measurement result from the terminal device.

The first aspect further provides a secondary cell activation method, including:
  receiving, by a terminal device, an activation command from an access network device, where the activation command is used to indicate activating a secondary cell;
  receiving, by the terminal device, first configuration information of a first reference signal from the access network device; and
  receiving, by the terminal device, the first reference signal according to the first configuration information, and obtaining a channel measurement result of the secondary cell according to the first reference signal.

According to the method, the terminal device may receive the first reference signal and the first configuration information of the first reference signal from the access network device, so that the terminal device performs channel measurement on the first reference signal according to the first configuration information. This solution avoids a scenario in which a secondary cell can be measured and activated based only on a fixedly configured CRS, so as to improve secondary cell activation flexibility, and improve secondary cell activation efficiency.

In an optional design, the first reference signal is located before an available second reference signal of the terminal device in time domain, and the second reference signal is configured by using second configuration information; or the first reference signal is located between two adjacent second reference signals of the terminal device in time domain, and the two adjacent second reference signals are configured by using same second configuration information.

In an optional design, the second reference signal is periodic.

In an optional design, the first reference signal is a synchronization signal or a channel state information reference signal.

In an optional design, the activation command includes the first configuration information; or the terminal device receives the first configuration information before the activation command; or the activation command includes a first part of the first configuration information, and the terminal device receives a second part of the first configuration information before the activation command.

In an optional design, the first configuration information includes at least one of the following information:
  a reference signal sending indication;
  a reference signal sending time;
  a reference signal period;
  a reference signal time domain resource location;
  a reference signal frequency domain resource location; and
  a reference signal configuration index, where the reference signal configuration index is used to indicate a location of reference signal configuration information.

In an optional design, the sending time of the first reference signal is a time difference between a time at which the access network device sends the first reference signal and a time at which the access network device sends the activation command, or is a time at which the access network device sends the first reference signal.

In an optional design, the terminal device sends the channel measurement result to the access network device.

According to a second aspect, an access network device is provided, including a transmitter and a processor, where
  the processor is configured to determine first configuration information of a first reference signal;

the transmitter is configured to send an activation command to a terminal device, where the activation command is used to indicate activating a secondary cell;

the transmitter is further configured to send the first configuration information of the first reference signal that is determined by the processor to the terminal device; and the transmitter is further configured to send the first reference signal to the terminal device according to the first configuration information, where the first reference signal is used to obtain a channel measurement result of the secondary cell.

In an optional design, the first reference signal is located before an available second reference signal of the terminal device in time domain, and the second reference signal is configured by using second configuration information; or the first reference signal is located between two adjacent second reference signals of the terminal device in time domain, and the two adjacent second reference signals are configured by using same second configuration information.

In an optional design, if the processor determines that the terminal device is not synchronized with the secondary cell, the reference signal is a synchronization signal; or if the processor determines that the terminal device is synchronized with the secondary cell, the reference signal is a channel state information reference signal.

In an optional design, the activation command includes the first configuration information; or the transmitter sends the first configuration information before the activation command; or the activation command includes a first part of the first configuration information, and the transmitter sends a second part of the first configuration information before the activation command.

In an optional design, before the transmitter sends the first reference signal to the terminal device according to the first configuration information, when the processor determines that a difference between the available second reference signal of the terminal device and a current time exceeds a first threshold, the processor determines that the first reference signal is sent to the terminal device, where the first threshold is preset.

In an optional design, the access network device further includes a receiver, and the receiver is configured to receive the channel measurement result from the terminal device.

The second aspect further includes a communications apparatus, where the communications apparatus includes a receiver and a processor;

the receiver is configured to receive an activation command from an access network device, where the activation command is used to indicate activating a secondary cell;

the receiver is further configured to receive first configuration information of a first reference signal from the access network device;

the receiver is further configured to receive the first reference signal according to the first configuration information; and the processor is configured to obtain a channel measurement result of the secondary cell according to the first reference signal.

In an optional design, the first reference signal is located before an available second reference signal of the communications apparatus in time domain, and the second reference signal is configured by using second configuration information; or the first reference signal is located between two adjacent second reference signals of the communications apparatus in time domain, and the two adjacent second reference signals are configured by using same second configuration information.

In an optional design, the activation command includes the first configuration information; or the receiver receives the first configuration information before the activation command; or the activation command includes a first part of the first configuration information, and the receiver receives a second part of the first configuration information before the activation command.

In an optional design, the communications apparatus further includes a transmitter, and the transmitter is configured to send the channel measurement result to the access network device.

In the access network device and the communications apparatus provided in the second aspect, optional designs are as follows:

In an optional design, the second reference signal is periodic.

In an optional design, the first reference signal is a synchronization signal or a channel state information reference signal.

In an optional design, the first configuration information includes at least one of the following information:

a reference signal sending indication;

a reference signal sending time;

a reference signal period;

a reference signal time domain resource location;

a reference signal frequency domain resource location; and a reference signal configuration index, where the reference signal configuration index is used to indicate a location of reference signal configuration information.

The reference signal sending time of the first reference signal is a relative time difference between a time at which the access network device (the transmitter of the access network device) sends the first reference signal and a time at which the access network device (the transmitter of the access network device) sends the activation command, or is a time at which the access network device (the transmitter of the access network device) sends the first reference signal.

According to a third aspect, the present invention provides a system, including the access network device and the communications apparatus provided in the second aspect.

According to a fourth aspect, the present invention provides a communications apparatus, where the communications apparatus includes a processor and a memory, the memory stores a computer program, and when the processor executes the computer program, the method in the foregoing aspect is implemented.

According to a fifth aspect, the present invention provides a computer storage medium storing a computer program, where the computer storage medium stores a computer program, and when the computer program is executed by a processor, the method in the foregoing aspect is implemented.

According to a sixth aspect, the present invention provides a computer program product including an instruction, where when the computer program product is run on a computer, the computer is enabled to perform the method in the foregoing aspect.

According to a seventh aspect, the present invention provides a chip system, where the chip system includes a processor, configured to support the access network device or the communications apparatus in implementing functions in the foregoing aspect, for example, generating or processing data and/or information in the foregoing method. In a possible design, the chip system further includes a memory, and the memory is configured to store a program instruction and data that are necessary for the access network device or the communications apparatus. The chip system may include a chip, or may include a chip and another discrete component.

The embodiments of the present invention provide the secondary cell activation method, the access network device, the communications apparatus, and the communications system. According to the solutions of the embodiments of the present invention, the access network device may send the first reference signal and the first configuration information of the first reference signal to the terminal device, so that the terminal device performs channel measurement on the first reference signal according to the first configuration information. This solution avoids scenarios in which a secondary cell can be measured and activated based only on a fixedly configured reference signal, so as to improve secondary cell activation flexibility, and improve secondary cell activation efficiency.

BRIEF DESCRIPTION OF DRAWINGS

To describe the technical solutions in the embodiments of the present invention more clearly, the following briefly describes the accompanying drawings required for describing the embodiments. It is clearly that the accompanying drawings in the following description show merely some embodiments of the present invention, and a person of ordinary skill in the art may derive other drawings from these accompanying drawings without creative efforts.

DESCRIPTION OF EMBODIMENTS

To make the objectives, technical solutions, and advantages of the present invention clearer, the following further describes the implementations of the present invention in detail with reference to the accompanying drawings.

In a conventional secondary cell activation method, in response to an activation command received from an access network device, a terminal device measures a reference signal and feeds back a measurement result. When a secondary cell is in an inactive state, the terminal device does not listen to a downlink control channel, does not send uplink data and channel state information, or the like in the secondary cell. After the secondary cell is activated, the terminal device starts corresponding listening and transmission.

It should be noted herein that, in a secondary cell activation process, the access network device needs to obtain, from the terminal device, information related to a current downlink channel state, and the information is usually referred to as channel state information (CSI). In an LTE release 8, the CSI includes channel quality information (CQI), a precoding matrix indication (PMI), and a rank indication (RI). In a subsequent release, CSI in another form is further included, for example, explicit channel quantization, effective channel quantization including receiver processing, a noise plus interference feedback, and a receive covariance feedback. In the embodiments of the present invention, specific content included in the CSI is not limited. A CSI report may be periodically reported by the terminal according to configuration information of the CSI, or may be fed back by the terminal device in response to a request of the access network device. The terminal device may determine, according to a location at which the request is received, a cell that needs to be measured, or add information used to identify the cell to the request of the access network device, so that the terminal device determines the cell that needs to be measured. To feed back a CSI measurement report, the terminal device needs to measure a downlink reference signal.

Figure 1:
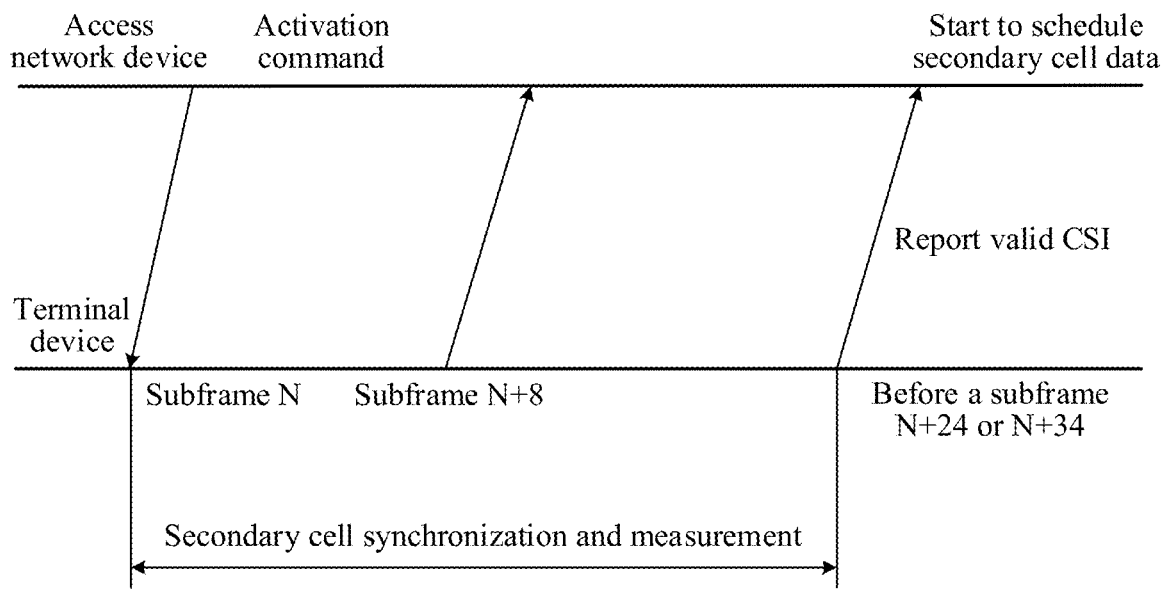
FIG. 1 is a flowchart of a secondary cell activation method in a conventional LTE system.

FIG. 1 shows a secondary cell activation method in a conventional LTE system. In the LTE system, one cell corresponds to one carrier, and technical processing in cell activation is the same as that in carrier activation. A reference signal used for CSI measurement in the LTE system is a common reference signal CRS. When an access network device needs to activate a secondary cell for a terminal device, the access network device sends a secondary cell activation command to the terminal device. In response to the activation command, the terminal device performs channel measurement according to the reference signal, and feeds back CSI. Before obtaining a valid CSI measurement value, the terminal device needs to first obtain initial synchronization according to a synchronization signal of the secondary cell, and then obtain fine synchronization according to a reference signal of the secondary cell, so as to perform CSI measurement and generate the CSI. When the terminal device receives a first secondary cell activation command in a subframe N, to make the access network device and the terminal device have a same understanding, the terminal device starts to report the CSI of the to-be-activated secondary cell after a subframe N+8. For example, the terminal device needs to report the CSI in a subframe N+4 and a subframe N+10 according to a CSI reporting period. Therefore, a CSI report of a first secondary cell is carried in the subframe N+10 instead of a CSI report of the subframe N+4. However, for a secondary cell in a deactivated state, a time at which the terminal device can obtain valid CSI may vary with a state in which the terminal device tracks the deactivated secondary cell, for example, whether the terminal device is synchronized with the secondary cell, or whether the terminal device measures the secondary cell within a specific time. If the terminal device is not synchronized with the secondary cell, or does not measure the secondary cell within a specific time, the terminal device may not obtain a valid CSI measurement value when reporting the CSI in the subframe N+10 after the subframe N+8 for the first time. In this case, the terminal device needs to fill a special measurement value into the CSI reported in the subframe N+10, to notify the access network device that the terminal device does not obtain the valid measurement value. The terminal device does not start to fill a normal CSI measurement value until the terminal device receives and measures a CRS in a synchronization state to obtain the valid CSI measurement value. However, the terminal device starts to report valid CSI in a subframe that is not later than a subframe N+24 (for example, the terminal device has recently measured the secondary cell, or the terminal device is synchronized with the secondary cell) or a subframe N+34 (for example, the terminal device has not recently measured the secondary cell, or the terminal device is not synchronized with the secondary cell). For example, if the terminal device has measured the secondary cell within a time before the terminal device receives the activation command, the terminal device needs to report the valid CSI before the subframe N+24. If the terminal device has not measured the secondary cell within a time before the terminal device receives the activation command, the terminal device needs to report a valid CSI before the subframe N+34.

It should be noted that, in the following embodiments of the present invention, a delay between the access network device and the terminal device is ignored, to ensure that a signal or information that are transmitted between the access network device and the terminal device take effect at the same time.

The technology in the present invention may be applied to a long term evolution (LTE) system or other wireless communications systems using various radio access technologies, for example, systems using access technologies such as code division multiple access, frequency division multiple access, time division multiple access, orthogonal frequency division multiple access, and single carrier frequency division multiple access. Particularly, the technology may be applied to a subsequent evolved system using the LTE system and a new radio (NR) system such as a fifth-generation (5G) system. The system includes an access network device and a terminal device. The access network device includes at least one cell, and provides a service for the terminal device by using the cell. In a system to which a carrier aggregation technology is applied, a plurality of component carriers that all serve one terminal device include a primary component carrier and a secondary component carrier. Cells aggregated by the terminal device having a carrier aggregation function include one primary cell and several secondary cells. A cell corresponding to the primary component carrier is referred to as a primary cell, and a cell corresponding to the secondary component carrier is referred to as a secondary cell. The primary cell (PCell) provides non-access stratum NAS) mobility information (for example, a tracking area identity (TAI)) during radio resource control (RRC) connection establishment, re-establishment, or switching. The secondary cell (SCell) may be activated or deactivated by the access network device, and implements data transmission between the access network device and the terminal device when the secondary cell is activated. It should be noted herein that the primary cell and the secondary cell each may function differently in different systems. With development of technologies, the primary cell and the secondary cell may have further meanings in the NR system. This is not specifically limited herein.

The terminal device in the present invention is a device having wireless receiving and sending functions, and may be deployed on land, for example, an indoor or outdoor device, a handheld device, or a vehicle-mounted device, or may be deployed on water (for example, on a steamship), or may be deployed in the air (for example, on an airplane, a balloon, or a satellite). The terminal device may be a mobile phone, a tablet computer (Pad), a computer having wireless receiving and sending functions, a virtual reality (VR) terminal device, an augmented reality (AR) terminal device, an industrial control wireless terminal, a self driving wireless terminal, a remote medical wireless terminal, a smart grid wireless terminal, a transportation safety wireless terminal, a smart city wireless terminal, a smart home wireless terminal, or the like.

The access network device in the present invention is an apparatus that is deployed in a radio access network and that is configured to provide a wireless communication function for the terminal device, for example, a base station (BS). The base station may include various forms of macro base stations, micro base stations, relay stations, access points, and the like. A name of a base station having a base station function may vary with a radio access technology used in a system. For example, in an LTE network, the base station is referred to as an evolved NodeB (i.e., an evolved NodeB, eNB or eNodeB), in a third-generation 3G network, the base station is referred to as a NodeB or the like, and in a subsequent evolved system, the base station may be referred to as a gNB. It should be noted that, in the 5G or NR system, one NR gNB may include one or more transmission reception points (TRP). All TRPs belong to a same cell, and both each TRP and the terminal can use a measurement reporting method described in the embodiments of the present invention. In another scenario, the network device 12 may further include a control unit (CU) and a data unit (DU). One CU may correspond to a plurality of DUs, and both each DU and the terminal can use the measurement reporting method described in the embodiments of the present invention. A difference between a CU-DU separation scenario and a multi-TRP scenario lies in that the TRP is merely a radio frequency unit or an antenna device while the DU can implement a protocol stack function. For example, the DU can implement a physical layer function.

For ease of description, in this application, the access network device and the terminal device are used as examples to describe the embodiments.

Figure 2:
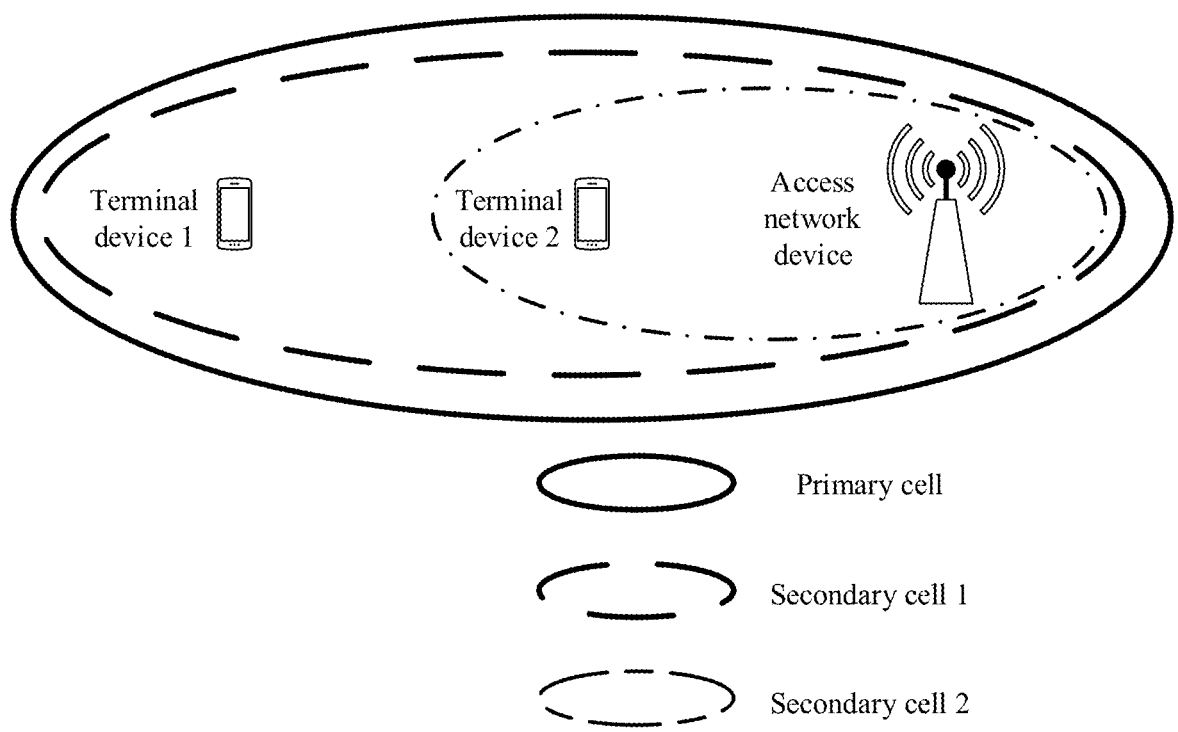
FIG. 2 is a schematic structural diagram of a communications system 100 according to an embodiment.

FIG. 2 is a schematic structural diagram of a communications system 100 according to an embodiment. The communications system includes an access network device and terminal devices 1 and 2. Serving cells of the terminal device 1 and the terminal device 2 are from a same access network device. In a communications system to which a carrier aggregation technology is applied, a plurality of component carriers that all serve one terminal device include a primary component carrier and a secondary component carrier. Cells aggregated by the terminal device having a carrier aggregation function include one primary cell and several secondary cells. A cell corresponding to the primary component carrier is referred to as a primary cell, and a cell corresponding to the secondary component carrier is referred to as a secondary cell. The primary cell (PCell) is a cell determined during initial access of the terminal device. The terminal device establishes a radio resource control connection in the primary cell, and performs initial call establishment, radio resource control (RRC) reconfiguration, cell handover, and the like in the primary cell. The secondary cell (SCell) is added during RRC reconfiguration, and is configured to provide an additional radio resource and perform data transmission. The access network device may activate or deactivate the secondary cell according to a requirement. When the secondary cell is in an inactive state, the terminal device does not listen to a downlink control channel, does not send uplink data and channel state information, or the like in the secondary cell. After the secondary cell is activated, the terminal device starts corresponding listening and transmission. In FIG. 1, the terminal device 1 and the terminal device 2 are separately connected to a plurality of carriers of the access network device. A serving cell of the terminal device 2 includes a primary cell and two secondary cells (a secondary cell 1 and a secondary cell 2). A serving cell of the terminal device 1 includes the primary cell and the secondary cell 1.

When the secondary cell needs to be activated, the access network device sends an activation command to the terminal device. In response to the activation command received from the access network device, the terminal device measures a channel state and feeds back a measurement result of the channel state. To obtain channel state information, the terminal device needs to measure a downlink reference signal. In other words, in a secondary cell activation process, the access network device needs to obtain a measurement result of a downlink channel state from the terminal device, for example, the channel state information (CSI). In an LTE release 8, the CSI includes channel quality information (CQI), a precoding matrix indication (Precoding Matrix Indication, PMI for short), and a rank indication (Rank Indication, RI for short), and may further include CSI in another form, for example, a noise plus interference feedback and a receive covariance feedback. In this embodiment of the present invention, specific content included in the CSI is not limited.

An example in which the communications system 100 is an NR system is used below for description. A reference signal used in the NR system in this embodiment of the present invention may not include a CRS. A reference signal used for channel state measurement required by secondary cell activation includes a synchronization signal or an additional reference signal (ARS). The synchronization signal includes a primary synchronization signal and a secondary synchronization signal. A sending period of the reference signal may be configured. In the NR system, the synchronization signal may further include a signal of another type. In this embodiment of the present invention, when the synchronization signal is used to measure secondary cell activation, one or more of a plurality of different signals included in the synchronization signal may be measured. This is not specifically limited herein.

The synchronization signal is a known sequence, and may be a sequence with good autocorrelation and low cross-correlation, for example, a Zadoff-Chu (ZC) sequence. The terminal device performs synchronization correlation with the synchronization signal from the access network device according to a local sequence, to implement synchronization with the access network device. A difference between NR and a conventional communications system lies in that a beamforming technology is used in the NR system. In the beamforming technology, a propagation direction may be controlled by using an analog beam and/or a digital beam, to obtain a significant gain. The NR system transmits a control channel in a beamforming transmission manner. A reference signal corresponding to the control channel is also transmitted by using a same beam. To more flexibly perform synchronization, a sending period of the synchronization signal may be dynamically configured.

In a high-frequency multi-beam transmission scenario, one cell corresponds to at least one beam. A synchronization signal of each cell includes at least one synchronization signal block (SS block). The corresponding synchronization signal block is sent on the at least one beam corresponding to the cell. To be specific, synchronization signals of a plurality of cells are sent in a synchronization signal set period, and one period includes several synchronization signal bursts (SS burst), each synchronization signal burst corresponds to one cell, and each synchronization signal burst includes at least one synchronization signal block. When activating a secondary cell, the access network device needs to send the synchronization signal block on some or all of the at least one beam. The terminal device measures each synchronization signal block, feeds back a measurement result of each synchronization signal block, and reports CSI to the access network device.

In addition to the synchronization signal, the additional reference signal may be further used to perform CSI measurement. The additional reference signal may, for example, include a channel state information-reference signal (CSI-RS). The additional reference signal may be independently sent for the terminal device. Therefore, a sending period or a sending frequency of the additional reference signal may also be configured, so as to more quickly and more accurately perform measurement.

This embodiment provides a secondary cell activation method. The access network device may send a first reference signal and first configuration information of the first reference signal to the terminal device, so that the terminal device performs channel measurement on the first reference signal according to the first configuration information. This improves secondary cell activation flexibility and efficiency.

It should be noted that the activation command may be used to indicate activating one or more secondary cells. When the activation command indicates activating a plurality of secondary cells, the access network device activates the plurality of secondary cells in a same manner. A procedure of activating one secondary cell is used as an example below for description. A person skilled in the art may learn that, when the activation command indicates activating a plurality of secondary cells, the secondary cell activation method in this embodiment of the present invention may be used for any one of the plurality of to-be-activated secondary cells.

The following further describes this embodiment of the present invention in detail.

Figure 3:
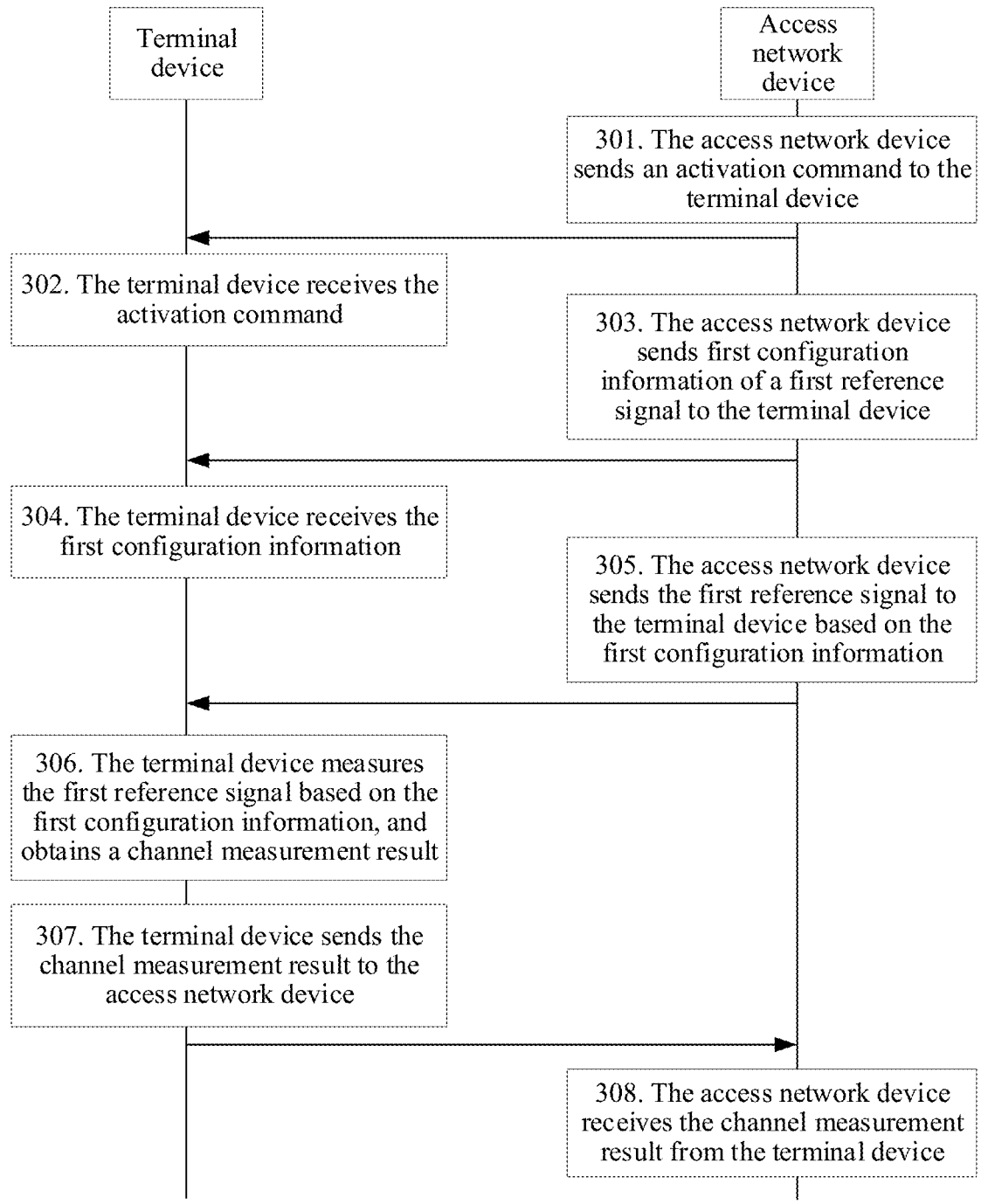
FIG. 3 is a flowchart of a secondary cell activation method according to an embodiment.

FIG. 3 is a flowchart of a secondary cell activation method according to an embodiment. The method specifically includes the following steps:

Step 301: An access network device sends an activation command to a terminal device, where the activation command is used to indicate activating a secondary cell, and the terminal device at Step 302 receives the activation command.

Step 303: The access network device sends first configuration information of a first reference signal to the terminal device, and the terminal device at Step 304 receives the first configuration information.

The first reference signal is used by the terminal device to perform channel measurement and generate a measurement result in response to the activation command.

Step 305: The access network device sends the first reference signal to the terminal device according to the first configuration information, where the first reference signal is used to obtain a channel measurement result of the secondary cell.

Step 306: The terminal device measures the first reference signal according to the first configuration information, and obtains the channel measurement result.

In steps 301 to 305, the access network device activates the secondary cell for the terminal device. Optionally, the method further includes step 307: The terminal device sends the channel measurement result to the access network device, and the access network device at Step 308 receives the channel measurement result from the terminal device. Finally, after the access network device receives the measurement result, the access network device and the terminal device may perform data or information transmission by using the secondary cell.

It should be noted herein that numbers of the foregoing steps do not limit a sequence in a specific execution process. In different optional designs, a sequence of performing the foregoing steps is adaptively adjusted.

According to the solution in this embodiment of the present invention, the access network device may send the first reference signal and the first configuration information of the first reference signal to the terminal device, so that the terminal device performs channel measurement on the first reference signal according to the first configuration information. This solution avoids a scenario in which a secondary cell can be measured and activated based only on a CRS with a fixed configuration or a fixed period, so as to improve secondary cell activation flexibility, and improve secondary cell activation efficiency.

It should be noted herein that numbers of the foregoing steps do not limit a sequence in a specific execution process. In different optional designs, a sequence of performing the foregoing steps is adaptively adjusted.

In step 301 in this embodiment, the access network device may send the activation command to the terminal device by using a primary cell or a secondary cell in an active state. The activation command may be physical layer signaling or higher layer signaling, for example, media access control (MAC) signaling or RRC signaling. The activation command may include an indication used to activate and/or deactivate at least one secondary cell, and may further include or indicate an identity of an activated or deactivated secondary cell in another manner, for example, a cell radio network temporary identifier (C-RNTI). In a specific indication manner, different states of a bit may be used to represent activation and deactivation. A format, a type, and an indication manner of the activation command are not specifically limited herein.

For example, a format of the MAC layer signaling for activating and/or deactivating the secondary cell may be as follows:

| $C_7$ | $C_6$ | $C_5$ | $C_4$ | $C_3$ | $C_2$ | $C_1$ | R |
|---|---|---|---|---|---|---|---|

The MAC signaling includes indicator bits $C_1$ to $C_7$ and one reserved bit R, and each indicator bit may be 1-bit. The indicator bits $C_1$ to $C_7$ correspond to seven secondary cells. For example, the seven secondary cells sequentially correspond to $C_1$ to $C_7$ in ascending order of cell identities. If a value of any of the indicator bits $C_1$ to $C_7$ is 1, it indicates that a secondary cell corresponding to the indicator bit is activated. If a value of the indicator bit is 0, it indicates that the secondary cell corresponding to the indicator bit is deactivated.

Optionally, before sending the activation command, the access network device determines whether the secondary cell needs to be activated for the terminal device, for example, whether a relatively large amount of data needs to be transmitted between the access network device and the terminal device, or whether a primary cell and a current secondary cell in an active state cannot meet a transmission requirement. For example, the access network device learns, through statistics collection, that an amount of data transmitted between the access network device and the terminal device within a time exceeds a specific threshold, and the current secondary cell cannot meet a transmission requirement. Alternatively, the access network may further receive feedback information from the terminal device. The feedback information is used to request the access network device to activate the secondary cell. For example, the terminal device determines that a service poses a relatively high requirement on a carrier resource or a network bandwidth. When the requirement meets a specific threshold, the terminal device sends the feedback information to the access network device. The feedback information may be an activation request. For a specific determining manner, refer to the prior approaches or another case in which the secondary cell may need to be activated. This is not specifically limited herein.

Optionally, the access network device may determine a quantity of secondary cells that need to be activated and the corresponding secondary cells voluntarily or according to a rule. For example, the access network device determines, according to a maintained load status of each secondary cell, one or more secondary cells with relatively light historical load as a secondary cell to be activated currently. For another example, the access network device randomly selects one or more secondary cells in a deactivated state. For still another example, the access network device determines a quantity of secondary cells that need to be activated and the corresponding secondary cells according to a rule. The rule is preconfigured by the access network device, or is pre-agreed on between the access network device and the terminal device, or is specified in a protocol or a standard. The access network device may further determine, according to an amount of data transmitted between the access network device and the terminal device, a quantity of secondary cells that need to be activated. This is not specifically limited herein.

In step 303 in this embodiment, the first reference signal may be any reference signal that can be used by the terminal device to perform channel measurement. The following first and second implementations in this embodiment separately describe a possible configuration manner of the first reference signal during specific implementation.

In the first implementation, the first reference signal is a reference signal having a configurable period. In a communications system, it is considered by default or it is specified that the reference signal is used by the terminal device to perform channel measurement in response to secondary cell activation command. In this implementation, in response to the activation instruction, the terminal device waits to receive and measure a downlink reference signal according to the configuration information of the first reference signal. This overcomes a disadvantage that a secondary cell can be measured only by using a CRS, and improves secondary cell activation flexibility.

Specifically, the first reference signal may be a synchronization signal SS or an additional reference signal (ARS). The access network device may send the first configuration information of the first reference signal to the terminal device in any one of a plurality of notification manners, for example, radio resource control (RRC) signaling, broadcast information, MAC signaling, or physical layer signaling. The additional reference signal may be specifically a CSI-RS or a mobility reference signal (MRS). The first configuration information includes at least one of the following information: a reference signal sending indication, a reference signal sending time, a reference signal period, a reference signal time domain resource location, a reference signal frequency domain resource location, and a reference signal configuration index. The reference signal configuration index is used to indicate a location of reference signal configuration information. Optionally, the sending time of the first reference signal is a time difference between a time at which the access network device sends the first reference signal and a time at which the access network device sends the activation command, or is a time at which the access network device sends the first reference signal.

In an implementation, the first reference signal is a synchronization signal. Regardless of whether the terminal device is synchronized with the to-be-activated secondary cell, the terminal device may activate the secondary cell by using the first reference signal. Specifically, if the terminal device is not synchronized with the to-be-activated secondary cell, the terminal device receives the synchronization signal to perform synchronization and measurement. If the terminal device is synchronized with the to-be-activated secondary cell, the terminal device measures the synchronization signal to obtain the channel measurement result.

In another implementation, the first reference signal is an additional reference signal such as a CSI-RS.

It should be noted that, in this implementation, the first reference signal is configured by the access network device by using the first configuration information, before the access network device sends the activation command, and does not change with a scenario of sending the activation command or a scenario of activating the secondary cell. Therefore, in this implementation, configuration information of the first reference signal may be referred to as the first configuration information. However, a meaning of the first configuration information is different from that of "first configuration information" when there is further "third configuration information" in the subsequent second implementation.

Figure 4:
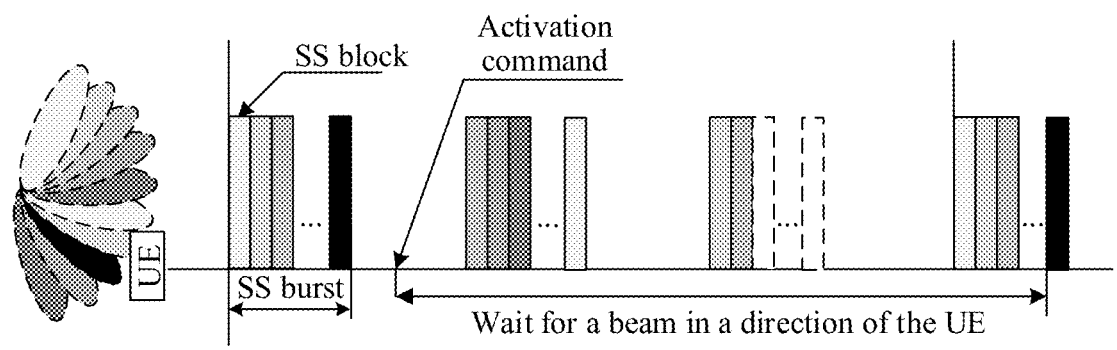
FIG. 4 is a schematic diagram of synchronization signal transmission in a scenario of a plurality of beams in an NR system.

As described above, in an NR system in this embodiment, to more flexibly perform synchronization, a sending period of the synchronization signal may be dynamically configured. Although the synchronization signal is sent periodically, the period may be relatively long or relatively short. In this scenario in which the period of the synchronization signal is dynamically configured, when the access network device needs to activate the secondary cell for the terminal device, if the access network device currently configures a relatively long period of the synchronization signal, the terminal device needs to wait a relatively long time before performing measurement. The following provides a specific description with reference to FIG. 4. FIG. 4 is a schematic diagram of synchronization signal transmission in a scenario of a plurality of beams in an NR system. During multi-beam transmission, the secondary cell may interact with the terminal device on a plurality of beams. When sending the synchronization signal, the access network device needs to separately send a corresponding synchronization signal block on some or all of the plurality of beams corresponding to the secondary cell, to form a synchronization signal burst. In one synchronization signal period, if a synchronization signal burst (corresponding to a black beam) corresponding to the to-be-activated secondary cell just ends when the terminal device receives the activation command for the to-be-activated secondary cell, the terminal device needs to wait for a synchronization signal burst (corresponding to a black beam) in a next synchronization signal period. Consequently, a relatively great delay is caused in a secondary cell activation process, especially when the synchronization signal period is relatively long.

To resolve the foregoing problem, this embodiment further provides the following second implementation. In the second implementation, the first reference signal is temporarily configured or temporarily sent by the access network device, so that the terminal device responds to the secondary cell activation command.

In a first optional design of the second implementation, the first reference signal is located before an available second reference signal of the terminal device in time domain, and the second reference signal is configured by using second configuration information. The second reference signal may be a reference signal that is the same as the first reference signal. For example, both the first reference signal and the second reference signal are synchronization signals. The second reference signal may alternatively be a reference signal that is different from the first reference signal. For example, the first reference signal is a synchronization signal, and the second reference signal is an additional reference signal.

Specifically, an example in which both the first reference signal and the second reference signal are synchronization signals is used for description. When the access network device determines that a period of the second reference signal that is currently configured for synchronization is relatively long, and the terminal device needs to wait a relatively long time before receiving the available second reference signal in a secondary cell activation process, the access network device may send the first configuration information to the terminal device to configure the first reference signal with a relatively short period, to activate the secondary cell. After sending the first synchronization signal, the access network device may send the second configuration information to restore an original period configuration of the second synchronization signal, or reconfigure the period of the second synchronization signal.

In a second optional design of the second implementation, the first reference signal is located between two adjacent second reference signals of the terminal device in time domain, and the two adjacent second reference signals are configured by using same second configuration information. The second reference signal may be a reference signal that is the same as the first reference signal. For example, both the first reference signal and the second reference signal are synchronization signals. The second reference signal may alternatively be a reference signal that is different from the first reference signal. For example, the first reference signal is a synchronization signal, and the second reference signal is an additional reference signal.

For example, the access network device configures the second reference signal having a specific period by using the second configuration information. When the access network device determines that the period of the second reference signal that is currently configured for synchronization is relatively long, and the terminal device needs to wait a relatively long time before receiving the available second reference signal in a secondary cell activation process, the access network device may temporarily insert the first reference signal between the two adjacent second reference signals. In this way, the access network device does not need to reconfigure the second reference signal, but only needs to configure the first reference signal by using the first configuration information.

In the second optional design, the configuration of the first reference signal is different from a configuration of an existing reference signal of a same type, and the first reference signal is temporarily sent to activate the secondary cell. To distinguish between the configuration of the first reference signal and the configuration of the existing reference signal of a same type, herein, the configuration information of the temporarily sent first reference signal is referred to as the first configuration information, a reference signal that has a same type as the first reference signal and that has been preconfigured or dynamically configured before the first reference signal is referred to as a third reference signal, and configuration information of the third reference signal is referred to as third configuration information. In the NR system, there may be some reference signals that are aperiodically configured. Therefore, whether the third reference signal is a periodically or aperiodically configured reference signal is not limited in this embodiment of the present invention. The first configuration information is determined when the access network device determines, when the secondary cell is activated, that there is a resource that can be used to temporarily send the first reference signal used to activate the secondary cell, and may be specifically sent to the terminal device by using higher layer signaling or physical layer signaling. This is not specifically limited herein. For ease of description, the following provides a description by using a CSI-RS as an example for a case in which the first reference signal is an additional reference signal.

It should be noted herein that the second reference signal is a reference signal that is specified in the communications system and that is used to perform channel measurement in response to the secondary cell activation command, or is a reference signal that has a function of performing channel measurement in response to the secondary cell activation command. In addition, the second reference signal is also configured for measurement (for example, the synchronization signal is configured for synchronization). Configuration information of the second reference signal is referred to as the second configuration information. The second configuration information is semi-statically or dynamically configured by the access network device, or is specified in a protocol or a standard, or is negotiated by the access network device and the terminal device, or is determined in another manner to activate the secondary cell. The second configuration information does not change with a scenario of activating the secondary cell. The first reference signal is a reference signal that is temporarily sent to perform channel measurement when the secondary cell is activated, and the configuration information of the first reference signal is referred to as the first configuration information. The first reference signal and the second reference signal may be reference signals of a same type, or may be reference signals of different types.

In the second implementation, before step 303, optionally, the access network device needs to determine whether to send the first reference signal to the terminal device. Specifically, FIG. 5 is a schematic diagram of an optional configuration of the first reference signal in a secondary cell activation method.

Figure 5:
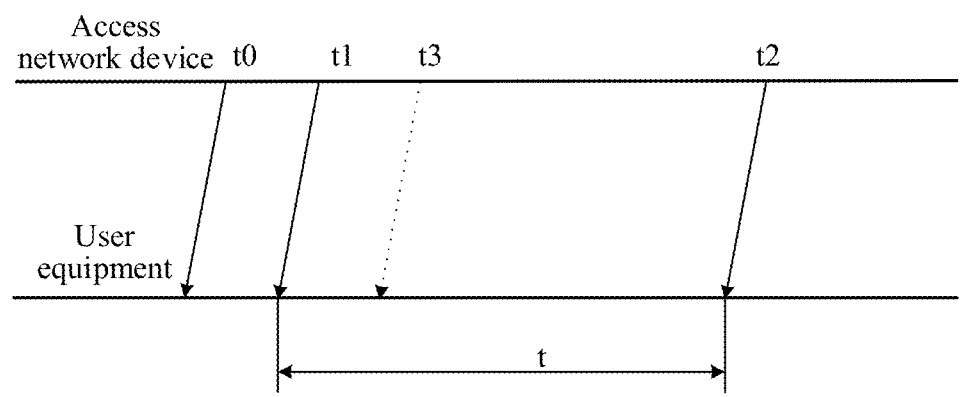
FIG. 5 is a schematic diagram of an optional configuration of a first reference signal in a secondary cell activation method according to an embodiment.

In FIG. 5, the access network device determines to activate the secondary cell for the terminal device, and sends the activation command at a moment t1. The access network device determines, according to the second configuration information, that a moment t0 and a moment t2 are adjacent moments at which the access network device delivers the second reference signal according to the second configuration information. The moment t0 is before the moment t1, and the moment t2 is after the moment t1. In this case, the terminal device needs to wait first duration t after receiving the activation command, to receive and measure a corresponding reference signal, where t=t2−t1. If a period of the reference signal is relatively long, or the activation command needs to be delivered after the moment t0 just passes, the terminal device needs to wait a very long time before measuring the corresponding second reference signal at the moment t2.

In this scenario, to reduce a delay generated when the secondary cell is activated and improve secondary cell activation efficiency, the access network device may temporarily send a group of first reference signals at a moment t3 between the moment t1 and the moment t2, so that the terminal device can quickly detect a reference signal and feed back a measurement result in response to the activation command. The temporarily sent reference signal is sent according to the first configuration information, and the first configuration information needs to be notified to the terminal device before the temporarily sent reference signal is sent. Content and a sending manner of the first configuration information are described in detail below. Optionally, the access network device determines a first threshold, so that the access network device determines to temporarily send a group of reference signals for secondary cell activation when the first duration t is greater than the first threshold. Optionally, the first threshold may be determined by the access network device voluntarily, or may be specified in a standard or a protocol, or may be negotiated by the access network device and the terminal device. This is not specifically limited herein.

Specifically, when the first reference signal needs to be sent, to send the first reference signal, the access network device further needs to determine an available resource to send the first reference signal, and determine the first configuration information according to the available resource.

The following further describes the second implementation by using examples.

Example 1: The first reference signal is a synchronization signal SS, and the first configuration information in step 303 is configuration information of a synchronization signal SS that is temporarily sent to activate the secondary cell.

In an optional design, an example in which the second reference signal is a synchronization signal is used. In an existing LTE system, a period of the synchronization signal SS is fixed, for example, 5 ms. In the NR system, a period of the synchronization signal may be dynamically configured, and periods may differ greatly in duration. To improve secondary cell activation efficiency, the access network device may temporarily send the SS, so that the terminal device measures the secondary cell.

With reference to the foregoing description of this embodiment of the present invention, if the access network device determines that a group of synchronization signals need to be temporarily sent, the access network device needs to determine whether there is an available resource that is used to send the synchronization signal. If there is an available resource, the access network device determines the first configuration information. If there is no available resource, the access network device cannot temporarily send the synchronization signal, and the terminal device may wait to receive and measure a synchronization signal at a next moment according to the activation command and the second configuration information.

If the access network device determines that there is a resource that can be used to temporarily send the first reference signal, namely, the synchronization signal, the access network device sends the first configuration information of the resource for temporarily sending the synchronization signal and the synchronization signal to the terminal device. The group of temporarily sent synchronization signals may be sent periodically, or may be sent once. This is not specifically limited herein. However, the first configuration information of the temporarily inserted synchronization signal needs to be sent to the terminal device, so that the terminal device receives and measures the synchronization signal. Specifically, the first reference signal is located before an available second reference signal of the terminal device in time domain, and the available second reference signal is configured by using second configuration information. Optionally, in time domain, the first reference signal is located between two second reference signals that are adjacent in time domain and that are configured by using the second configuration information.

In this optional design, in response to the secondary cell activation command, before sending a next second reference signal in time domain that can be used to perform channel measurement when the secondary cell is activated, the access network device may pre-configure the first reference signal by using the first configuration information, and send the first reference signal to the terminal device, so that the terminal device does not need to wait a relatively long time before receiving the foregoing available second reference signal, but quickly receives the first reference signal to perform channel measurement, and obtains the channel measurement result. This improves secondary cell activation efficiency.

In this optional design, the first reference signal and the second reference signal are reference signals of a same type, and are distributed at different locations in time domain. Sending of the first reference signal is configured by using the first configuration information, and is used to activate the secondary cell. Sending of the second reference signal is configured by using the second configuration information, and is used to implement synchronization with the terminal device. Optionally, the second reference signal is sent periodically, and a plurality of second reference signals are distributed at different time domain locations. This is not specifically limited herein.

In another optional design, the second reference signal may be a reference signal of another type other than a synchronization signal, for example, an additional reference signal. Herein, a CSI-RS is used as an example for description.

With reference to the foregoing description of this embodiment of the present invention, if the access network device determines that a group of synchronization signals need to be temporarily sent, the access network device needs to determine whether there is an available resource that is used to send the synchronization signal. If there is an available resource, the access network device determines the first configuration information. If there is no available resource, the access network device cannot temporarily send the synchronization signal, and the terminal device may wait to receive and measure a next available second reference signal according to the activation command and the second configuration information of the second reference signal CSI-RS that is specified in the communications system and that is used to activate the secondary cell.

If the access network device determines that there is a resource that can be used to temporarily send the first reference signal, namely, the synchronization signal, the access network device delivers the first configuration information of the resource for temporarily sending the synchronization signal and the synchronization signal to the terminal device. The group of temporarily sent synchronization signals may be sent periodically, or may be sent once. This is not specifically limited herein. However, the first configuration information of the temporarily inserted synchronization signal needs to be sent to the terminal device, so that the terminal device receives and measures the synchronization signal. Specifically, the first reference signal is located before an available second reference signal of the terminal device in time domain, and the available second reference signal is configured by using second configuration information. Optionally, in time domain, the first reference signal is located between two second reference signals that are adjacent in time domain and that are configured by using the second configuration information.

In this optional design, the first reference signal and the second reference signal are reference signals of different types, and are distributed at different locations in time domain. Sending of the first reference signal is configured by using the first configuration information, and is temporarily sent to activate the secondary cell. Sending of the second reference signal is configured by using the second configuration information, and is used to perform specific measurement. For example, the CSI-RS is used to measure data scheduling, and send a reference signal before data on an antenna port to perform measurement. For another example, the MRS is used to measure mobility of the terminal device. Optionally, the second reference signal is sent periodically, and a plurality of second reference signals are distributed at different time domain locations. This is not specifically limited herein.

In the example 1, the access network device does not need to consider whether the terminal device is synchronized with the secondary cell, but temporarily sends a group of synchronization signals when there is an available resource, so that the terminal device performs channel measurement. In this way, the terminal device is prevented from waiting a very long time, and secondary cell activation flexibility and efficiency are improved.

Example 2: The first reference signal is an additional reference signal such as a CSI-RS or an MRS, and the first configuration information in step 303 is configuration information of the additional reference signal. Similar to the first implementation, if the access network device determines that a group of additional reference signals need to be temporarily sent, the access network device needs to determine whether there is an available resource that is used to send the additional reference signal. If there is an available resource, the access network device determines the first configuration information. If there is no available resource, the access network device cannot temporarily send the additional reference signal, and the terminal device may wait to receive and measure an additional reference signal at a next moment according to the activation command and the second configuration information.

In an optional design, an example in which the second reference signal is an additional reference signal is used. The second reference signal and the first reference signal have a same type, for example, both are CSI-RSs. With reference to the foregoing description of this embodiment of the present invention, if the access network device determines that a group of first reference signals need to be temporarily sent, the access network device needs to determine whether there is an available resource that is used to send the first reference signal. If there is an available resource, the access network device determines the first configuration information. If there is no available resource, the access network device cannot temporarily send the first reference signal, and the terminal device may wait to receive and measure a second reference signal at a next moment according to the activation command and the second configuration information.

If the access network device determines that there is a resource that can be used to temporarily send the first reference signal, namely, the additional reference signal, the access network device delivers the first configuration information of the resource for temporarily sending the additional reference signal and the additional reference signal to the terminal device. The group of temporarily sent additional reference signals may be sent periodically, or may be sent once. This is not specifically limited herein. However, the first configuration information of the temporarily inserted additional reference signal needs to be sent to the terminal device, so that the terminal device receives and measures the additional reference signal. Specifically, the first reference signal is located before an available second reference signal of the terminal device in time domain, and the available second reference signal is configured by using second configuration information. Optionally, in time domain, the first reference signal is located between two second reference signals that are adjacent in time domain and that are configured by using the second configuration information.

In this optional design, the first reference signal and the second reference signal are additional reference signals of a same type, and are distributed at different locations in time domain. Sending of the first reference signal is configured by using the first configuration information, and is temporarily sent to activate the secondary cell. Sending of the second reference signal is configured by using the second configuration information, and is used to perform specific measurement. For example, the CSI-RS is used to measure data scheduling, and send a reference signal before data on an antenna port to perform measurement. Optionally, the second reference signal is sent periodically, and a plurality of second reference signals are distributed at different time domain locations. This is not specifically limited herein.

In another optional design, the second reference signal is a reference signal the type of which is different from the first reference signal. For example, the second reference signal is a synchronization signal, and the first reference signal is a CSI-RS.

With reference to the foregoing description of this embodiment, to activate the secondary cell, if the access network device determines that a group of CSI-RSs need to be temporarily sent, the access network device needs to determine whether there is an available resource that is used to send the CSI-RS. If there is an available resource, the access network device determines the first configuration information. If there is no available resource, the access network device cannot temporarily send the CSI-RS, and the terminal device may wait to receive and measure a next available second reference signal according to the activation command and the second configuration information of the second reference signal that is specified in the communications system and that is used to activate the secondary cell.

If the access network device determines that there is a resource that can be used to temporarily send the first reference signal, namely, the CSI-RS, the access network device delivers the first configuration information of the resource for temporarily sending the CSI-RS and the CSI-RS to the terminal device. The group of temporarily sent CSI-RSs may be sent periodically, or may be sent once. This is not specifically limited herein. However, the first configuration information of the temporarily inserted CSI-RS needs to be sent to the terminal device, so that the terminal device receives and measures the CSI-RS. Specifically, the first reference signal is located before an available second reference signal of the terminal device in time domain, and the available second reference signal is configured by using second configuration information. Optionally, in time domain, the first reference signal is located after a second reference signal that is located prior to the available second reference signal in time domain and that is configured by using the second configuration information.

In the example 2, the first reference signal and the second reference signal are reference signals of different types, and are distributed at different locations in time domain. Sending of the first reference signal is configured by using the first configuration information, and is temporarily sent to activate the secondary cell. Sending of the second reference signal is configured by using the second configuration information, and is used to implement synchronization between the terminal device and the cell. Optionally, the second reference signal is sent periodically, and a plurality of second reference signals are distributed at different time domain locations. This is not specifically limited herein.

It should be noted herein that, when it is considered by default or it is specified in the communications system that a synchronization signal is used to activate a secondary cell, the terminal device receives and measures the synchronization signal sent by the access network device, and feeds back the measurement result to the access network device. According to the foregoing description, the synchronization signal occupies more resources than the additional reference signal such as the CSI-RS, especially when the secondary cell corresponds to a plurality of beams, and a synchronization signal block needs to be sent on at least one of the plurality of beams to complete synchronization or secondary cell activation. To improve secondary cell activation efficiency, when determining that the synchronization signal needs to be temporarily sent to activate the secondary cell, the access network device may obtain, only after a very long time, sufficient resources used to temporarily send the synchronization signal, or cannot obtain, before a next available second reference signal configured by using the second configuration information is sent, sufficient resources used to temporarily send the synchronization signal. In this way, secondary cell activation efficiency cannot be improved. Therefore, in this optional design, because the additional reference signals such as the CSI-RS is of relatively sparse distribution on a resource, and occupies a relatively small quantity of resources, the access network device easily obtains an available resource used to temporarily send the first reference signal, so that the secondary cell can be quickly measured and activated.

Therefore, in the example 2, the first reference signal is the additional reference signal such as either of the CSI-RS and the MRS. The access network device may temporarily send, according to a requirement for activating the secondary cell, a group of first reference signals that are used to easily obtain a sending resource, to activate the secondary cell, so that secondary cell activation efficiency and flexibility are improved.

It should be noted herein that, in a scenario in which the additional reference signal is used to measure and activate the secondary cell, the terminal device needs to be synchronized with the secondary cell. In this case, before sending the additional reference signal, the access network device needs to determine a synchronization status. If determining that the terminal device is not synchronized with the secondary cell, the access network device can send the additional reference signal only after the terminal device is synchronized with the secondary cell, to subsequently activate and measure the secondary cell. For a manner of synchronization with the secondary cell, refer to implementation in prior approaches. A specific manner of activating the secondary cell by using the additional reference signal is similar to a manner of activating the secondary cell by using the synchronization signal. For details, refer to the descriptions of the foregoing implementations.

Example 3: Before step 303, an optional step may further be included: The access network device determines whether the terminal device is synchronized with the secondary cell.

If the access network device determines that the terminal device is not synchronized with the secondary cell, the first reference signal is a synchronization signal; or if the access network device determines that the terminal device is synchronized with the secondary cell, the first reference signal is either of an additional reference signal and a synchronization signal, or both an additional reference signal and a synchronization signal may be used as the first reference signal.

With reference to the foregoing description of the second implementation of this embodiment, if the access network device determines that a group of first reference signals need to be temporarily sent, the access network device determines, according to the foregoing determining result, a type of the first reference signal (a synchronization signal or an additional reference signal) that needs to be sent, and then the access network device determines whether there is an available resource that is used to send the first reference signal whose type is determined. If there is an available resource, the access network device determines the first configuration information. If there is no available resource, the access network device cannot temporarily send the first reference signal, and the terminal device may wait to receive and measure a next available second reference signal according to the activation command and the second configuration information.

If the access network device determines that there is a resource that can be used to temporarily send the first reference signal, the access network device delivers the first configuration information of the resource for temporarily sending the first reference signal and the first reference signal to the terminal device. The group of temporarily sent first reference signals may be sent periodically, or may be sent once. This is not specifically limited herein. However, the first configuration information of the temporarily inserted first reference signal needs to be sent to the terminal device, so that the terminal device receives and measures the first reference signal. Specifically, the first reference signal is located before an available second reference signal of the terminal device in time domain, and the second reference signal is configured by using second configuration information. Optionally, in time domain, the first reference signal is located between two second reference signals that are adjacent in time domain and that are configured by using the second configuration information.

Optionally, in step 307, the terminal device determines, according to whether the terminal device is synchronized with the secondary cell, whether the terminal device needs to detect a synchronization signal or an additional reference signal, and measures a corresponding reference signal according to the received first configuration information. It should be noted herein that the access network device and the terminal device determine, in a same manner, whether the terminal device is synchronized with the secondary cell. This determining manner may be pre-specified in a standard or a protocol, or may be negotiated by the access network device and the terminal device in advance, or may be notified by the access network device to the terminal device in advance. For example, the terminal device reports a valid measurement report once within a specified time, to activate the secondary cell. This is not specifically limited herein.

According to the description of the example 3, the access network device first determines a synchronization status of the terminal device, and determines, according to the synchronization status, a specific reference signal that is to be used to activate the secondary cell. This improves secondary cell activation flexibility and efficiency overall.

It should be noted that, in the second implementation, there is a scenario in which the terminal device cannot detect the first reference signal according to the first configuration information, for example, because of channel interference. In this case, in response to the activation command, the terminal device receives and measures, according to the second configuration information, a reference signal that is commonly configured and that is used to activate the secondary cell, and feeds back a measurement result to the access network device. Optionally, the measurement result may further include indication information. The indication information is used to indicate that the terminal device does not detect the first reference signal, but measures, according to the second configuration information, the reference signal used to activate the secondary cell, and obtains the measurement result. The access network device may determine subsequent processing according to the indication information, for example, activate another secondary cell. This is not limited herein.

Further, in the second implementation of this embodiment, in step 302, the first configuration information and the activation command may be separately sent to the terminal device, or may be sent to the terminal device together. Alternatively, the first configuration information includes a first part and a second part, and the access network device separately sends the first part and the second part to the terminal device.

In a first implementation, step 303 is performed before step 301. The first configuration information is sent by the access network device to the terminal device, for example, by using RRC configuration information. Step 303 is first performed: The terminal device first receives the first configuration information. Then, step 301 is performed: The access network device sends the activation command. In other words, before receiving the activation command, the terminal device obtains the configuration information of the reference signal used to activate the secondary cell. In this way, a design of the activation command can be simplified, or even a format of the activation command in prior techniques does not need to be changed, so that after receiving the activation command, the terminal device measures the first reference signal in time according to the first configuration information.

In this implementation, a sending time of the first configuration information may be statically or dynamically configured by the access network device, and a specific configuration manner is not specifically limited. The following describes several possible implementations.

In a first optional design, when configuring the secondary cell for the terminal device, the access network device configures, for the terminal device, the first configuration information of the first reference signal that is corresponding to the secondary cell and that is used to activate the secondary cell. When determining that the access network device sends the first reference signal, the terminal device receives and measures the first reference signal according to the first configuration information. Optionally, the first configuration information may be periodically or aperiodically sent by the access network device to the terminal device.

In a second optional design, the access network device sends the first configuration information to the terminal device within a preset time before the access network device sends the activation command. For example, if the access network device determines that a secondary cell needs to be activated for the terminal device, and determines that a group of first reference signals need to be temporarily sent, the access network device sends the first configuration information within a preset time before the access network device determines to send the activation command or before a preset time before the access network device sends the activation command.

Optionally, the preset time may be preconfigured by the access network device and notified to the terminal device, or may be pre-specified in a protocol or standard. Specifically, after receiving the first configuration information, the terminal device may determine to receive, within the preset time or after the preset time, the activation command sent by the access network device, and receive and measure, according to the first configuration information, the first reference signal after receiving the activation command.

In a third optional design, the access network device sends the first configuration information to the terminal device before the activation command. The first configuration information may be periodic or aperiodic, or may be sent once. The terminal device receives and measures, according to latest first configuration information received before the activation command, the first reference signal after receiving the activation command. In this implementation, how long the first configuration information is sent to the terminal device in advance is not limited. Before the activation command used to activate the secondary cell is sent, the terminal device needs to obtain the first configuration information to measure the first reference signal.

In this implementation, optionally, the access network device further sends reference signal indication information when sending the activation command. The indication information is used to indicate sending of the first reference signal, to notify the terminal device that the access network device is to deliver the first reference signal. The terminal device may determine, according to the indication information, that the access network device temporarily sends a group of first reference signals, and receive and measure the first reference signal according to the first configuration information. Optionally, the activation command does not need to carry the reference signal indication information, and the activation command is used to indicate that the access network device determines to send the first reference signal. After receiving the activation command, the terminal device receives and measures the first reference signal according to the first configuration information.

In a second implementation, steps 301 and 303 are performed at the same time: The access network device sends the activation command and the first configuration information to the terminal device at the same time. Herein, "at the same time" means that the first configuration information is included in the activation command, or the first configuration information and the activation command are included in one transport block and delivered to the terminal device as a whole. The transport block herein may be a minimum unit used by the terminal device to perform modulation and demodulation. Alternatively, the configuration information and the activation command are sent to the terminal device in different control units at the same time. The control unit herein may be a MAC control element (CE), or may be a physical downlink control channel (PDCCH) command. Alternatively, the control unit may be implemented in another manner. This is not specifically limited herein.

In a third implementation, step 303 is performed after step 301. Step 301 is first performed: The access network device sends the activation command to the terminal device. Then, step 303 is performed: The access network device sends the configuration information of the first reference signal to the terminal device. The terminal device receives the first configuration information after the activation command, and receives and measures the first reference signal according to the first configuration information. For a subsequent specific processing manner, refer to the foregoing description. Details are not described herein again.

Optionally, a time interval between a sending time of the activation command and a sending time of the first configuration information is T, and T may be fixed duration or non-fixed duration.

In a fourth implementation, the first configuration information may include a first part and a second part, and the access network device separately sends the first part and the second part to the terminal device by using first signaling and second signaling.

For example, the first part is sent to the terminal device by using the first signaling, and the second part is sent to the terminal device by using the second signaling. A type of the first signaling is different from that of the second signaling. Optionally, sending times of the first signaling and the second signaling may be the same or different. In addition, optionally, the first signaling or the second signaling may be one of MAC signaling, RRC signaling, or physical layer signaling, or may be signaling of another type.

For another example, the first part is sent to the terminal device by using the first signaling, and the second part is sent to the UE by using the second signaling. The first signaling and the second signaling have a same type but different sending times. Specifically, the first part and the activation command may be sent at the same time, and the second part may be sent before or after the activation command. Herein, "at the same time" may be that the first part is included in the activation command, or the first part and the activation command are included in one transport block and delivered to the terminal device as a whole. Alternatively, the first part and the activation command are sent to the terminal device in different control units at the same time. Alternatively, the control unit may be implemented in another manner. This is not specifically limited herein. For explanations of the transport block and the control unit, refer to the foregoing description.

Further, in the second implementation of this embodiment, the first configuration information may include one or more of a reference signal sending indication, a reference signal sending time, a reference signal period, a reference signal time domain resource location, a reference signal frequency domain resource location, or a reference signal configuration index. The reference signal sending indication is used to indicate sending of the first reference signal, the reference signal period is used to indicate a sending period of the reference signal (on the premise that the reference signal is sent periodically), and the reference signal configuration index is used to indicate a location of reference signal configuration information.

In an optional design, the first configuration information includes at least a reference signal sending time, and the reference signal sending time is used to indicate a sending time at which the access network device sends the first reference signal. In this design, the terminal device can detect the first reference signal according to the reference signal sending time.

Optionally, the reference signal sending time may be a time difference between a time at which the access network device sends the first reference signal and a time at which the access network device sends the activation command. In this way, the terminal device may determine the sending time of the first reference signal according to a receiving time of the activation command, and then perform corresponding measurement. For example, the reference signal sending time is a subframe offset value of the sending time of the first reference signal relative to the sending time of the activation command. If the value is 2, it indicates that the sending time of the first reference signal is after two subframes of the sending time of the activation command.

Optionally, the reference signal sending time may alternatively be an absolute time at which the access network device sends the first reference signal, for example, a number of a subframe or a frame of the first reference signal. The terminal device may receive and measure the reference signal according to the sending time. This is not specifically limited herein. For example, the reference signal sending time is a frame number and/or a subframe number of a radio frame in which the access network device sends the first reference signal.

For example, if the first configuration information further includes a time domain resource location and/or a frequency domain resource location of the first reference signal, the time domain resource location and/or the frequency domain resource location of the first reference signal are/is a time domain resource location and/or a frequency domain resource location at which the access network device sends the first reference signal. The terminal device may measure the reference signal according to the sending time and the time domain resource location and/or the frequency domain resource location of the first reference signal. If the first configuration information does not include the time domain resource location and/or the frequency domain resource location of the first reference signal, the terminal device may receive the reference signal according to the reference signal sending time in a detection manner similar to that in prior approaches, for example, blind detection. This is not specifically limited herein.

Optionally, the time domain resource location may be a symbol location, for example, a location of an orthogonal frequency-division multiplexing (OFDM) symbol, and/or the frequency domain resource location may be a quantity of carriers or subcarriers and/or locations of the carriers or subcarriers.

For another example, when the first reference signal is a periodic reference signal, the first configuration information may further include a reference signal period, so that the terminal device can obtain a sending period of the first reference signal, and measure the periodically sent first reference signal according to the reference signal sending time and the reference signal sending period. Further, the first configuration information may further include a time domain resource location and/or a frequency domain resource location of the reference signal.

For still another example, when the first reference signal is an additional reference signal such as a CSI-RS, the first configuration information may include a reference signal configuration index. The reference signal configuration index is used to indicate a location of reference signal configuration information. The reference signal configuration index corresponds to the reference signal configuration information. In other words, each reference signal configuration index corresponds to one group of reference signal configuration information. For example, a reference signal configuration index 1 corresponds to one or more of a first sending time, a first time domain resource location, a first frequency domain resource location, and a first period of a reference signal, and a reference signal configuration index 2 corresponds to one or more of a second sending time, a second time domain resource location, a second frequency domain resource location, and a second period of the reference signal. A correspondence between the reference signal configuration index and the reference signal configuration information is notified to the terminal device in advance. A specific notification manner may be common signaling or dedicated signaling. This is not specifically limited herein. The first configuration information includes the reference signal configuration index, so that signaling load for sending the first configuration information can be reduced. It should be noted herein that the first configuration information may include only the reference signal configuration index, and the terminal device obtains the configuration information of the first reference signal according to the received reference signal configuration index, to receive and measure the first reference signal.

In another optional design, the first configuration information includes at least a reference signal sending indication, and the reference signal sending indication is used to indicate sending of the first reference signal. In this design, the terminal device may receive and measure the first reference signal according to at least the sending indication in a detection manner similar to that in prior approaches, for example, blind detection.

Optionally, the first configuration information includes only a reference signal sending indication, and the terminal device detects and measures the first reference signal in a blind detection manner. The blind detection herein may be blind detection in prior approaches. An example in which the first reference signal is a synchronization signal is used. The terminal device may start to detect the synchronization signal according to a predefined synchronization signal sequence. When determining that the synchronization signal is detected, the terminal device measures the synchronization signal. A manner of "detecting the synchronization signal" mentioned herein may be the same as that of detecting the synchronization signal in prior approaches. For example, correlation processing may be performed according to the predefined synchronization signal sequence and a received sequence, and it is determined, according to a peak value of a correlation result, that the synchronization signal is detected.

Optionally, the first configuration information further includes one or more of a reference signal sending time, a reference signal period, a reference signal time domain resource location, a reference signal frequency domain resource location, and a reference signal configuration index.

In still another optional design, the first configuration information includes a first part and a second part. The first part may include one or more of a reference signal sending indication, a reference signal sending time, a reference signal period, a reference signal time domain resource location, a reference signal frequency domain resource location, and a reference signal configuration index. The second part may include one or more of a reference signal sending indication, a reference signal sending time, a reference signal period, a reference signal time domain resource location, a reference signal frequency domain resource location, and a reference signal configuration index. However, content included in the first part and content included in the second part do not overlap.

For example, the first part includes the reference signal sending indication, and the access network device sends the first part and the activation command at the same time. The second part includes one or more of the reference signal sending time, the reference signal period, the reference signal time domain resource location, the reference signal frequency domain resource location, and the reference signal configuration index, and the access network device sends the second part before the activation command. In this design, the terminal device first obtains the second part of the first configuration information, determines one or more of the reference signal sending time, the reference signal period, the reference signal time domain resource location, the reference signal frequency domain resource location, and the reference signal configuration index of the reference signal, and determines, according to the reference signal sending indication sent at the same time as the activation command, that the access network device sends the first reference signal, and receives and measures the first reference signal according to the previously received second part of the first configuration information.

For another example, the first part includes the reference signal sending time, and the access network device sends the first part and the activation command at the same time. The second part includes one or more of the reference signal period, the reference signal time domain resource location, the reference signal frequency domain resource location, and the reference signal configuration index, and the access network device sends the second part before the activation command. In this design, the terminal device first obtains the second part of the first configuration information, determines one or more of the reference signal period, the reference signal time domain resource location, the reference signal frequency domain resource location, and the reference signal configuration index, and determines, according to the reference signal sending time sent at the same time as the activation command, that the access network device sends the first reference signal, and receives and measures the first reference signal according to the previously received second part of the first configuration information.

Further, a beamforming technology is used in the NR system, and one cell may correspond to a plurality of beams. When the access network device needs to activate the secondary cell, a reference signal block needs to be separately sent on the plurality of beams corresponding to the secondary cell. The following further describes the second implementation of the present invention with reference to FIG. 4 by using an example in which the first reference signal is a synchronization signal. The following description is also applicable to the content related to sending of the first reference signal in the first implementation of the present invention. A difference lies in that, in the first implementation of the present invention, temporary sending of the reference signal is not mentioned, and the first configuration information does not need to be additionally notified, but only sending of the second configuration information is mentioned.

A to-be-activated secondary cell may correspond to a plurality of beams, and the access network device needs to send a reference signal on at least one of the plurality of beams, to activate the secondary cell. It should be noted herein that the access network device may send the reference signal on all the beams corresponding to the secondary cell, so that the terminal device performs measurement, or may determine some of the beams to send the reference signal. For determining of a beam on which the reference signal is sent, optionally, the access network device may estimate an approximate geographic location of the terminal device according to a location of a beam that is in a primary cell or another secondary cell in an active state and that serves the terminal device, and determine at least one beam in the plurality of beams corresponding to the secondary cell. A location of the determined at least one beam is close to the estimated location of the terminal device. The access network device may alternatively select a to-be-measured beam in another manner. This is not specifically limited herein.

In an optional design, in step 303, the first reference signal is a synchronization signal, the synchronization signal includes at least one synchronization signal block, and the first configuration information sent by the access network device to the terminal device includes configuration information of the at least one synchronization signal block. The configuration information of each synchronization signal block is used to indicate configuration information of a synchronization signal block sent by the access network device on a corresponding beam.

Further, in step 305, the access network device sends, to the terminal device according to the first configuration information, a corresponding synchronization signal block on the at least one beam corresponding to the to-be-activated secondary cell. Correspondingly, in step 304, the terminal device measures the detected at least one synchronization signal block, to obtain a corresponding channel measurement result. In step 307, the terminal device may send channel measurement results of all detected synchronization signal blocks to the access network device, or may feed back some channel measurement results indicating good channel quality. For example, only a measurement result indicating best channel quality may be fed back, so that the access network device can determine a beam location or an approximate geographic orientation of the terminal device. The following further describes step 307.

Further, optionally, in the first and the second implementations of the present invention, in step 306, that the terminal device measures the first reference signal according to the first configuration information specifically includes: The terminal device measures signal quality of the first reference signal.

Optionally, the signal quality measurement result may include one or more of reference signal received power (RSRP), a reference signal strength indicator (RSSI), reference signal received quality (RSRQ), and a signal to interference plus noise ratio (SINR). The signal quality measurement result may alternatively be other information for measuring signal quality in prior approaches. This is not specifically limited herein.

Further, optionally, in the first and the second implementations of this embodiment, in step 307, the terminal device sends the measurement result to the access network device in a manner that includes but is not limited to the following sending manners:

In a first implementation, the terminal device sends, according to a preset reporting time, the measurement result to the access network device when the reporting time arrives. The preset reporting time may be preconfigured by the access network device for the terminal device, or may be specified in a protocol or standard, or may be notified to the terminal device in another manner. In addition, the reporting time may be periodic, or may be dynamically configured. This is not limited herein. Optionally, the terminal may further send both the measured first reference signal or reference signal block and the measurement result to the access network device.

In a second implementation, when determining that the channel measurement result is greater than a specified threshold, the terminal device sends the measurement result to the access network device. The specified threshold may be determined according to an actual requirement, or may be determined according to an event in a wireless system. This is not limited herein.

In addition, the foregoing two implementations may be used in combination.

The solutions provided in the embodiments of the present invention are mainly described above from a perspective of interaction between network elements. It can be understood that, to implement the foregoing functions, the network elements such as the terminal device and the access network device include a corresponding hardware structure and/or software module for performing each of the functions. A person skilled in the art should easily be aware that, in combination with the examples described in the embodiments disclosed in this specification, units, and algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 6:
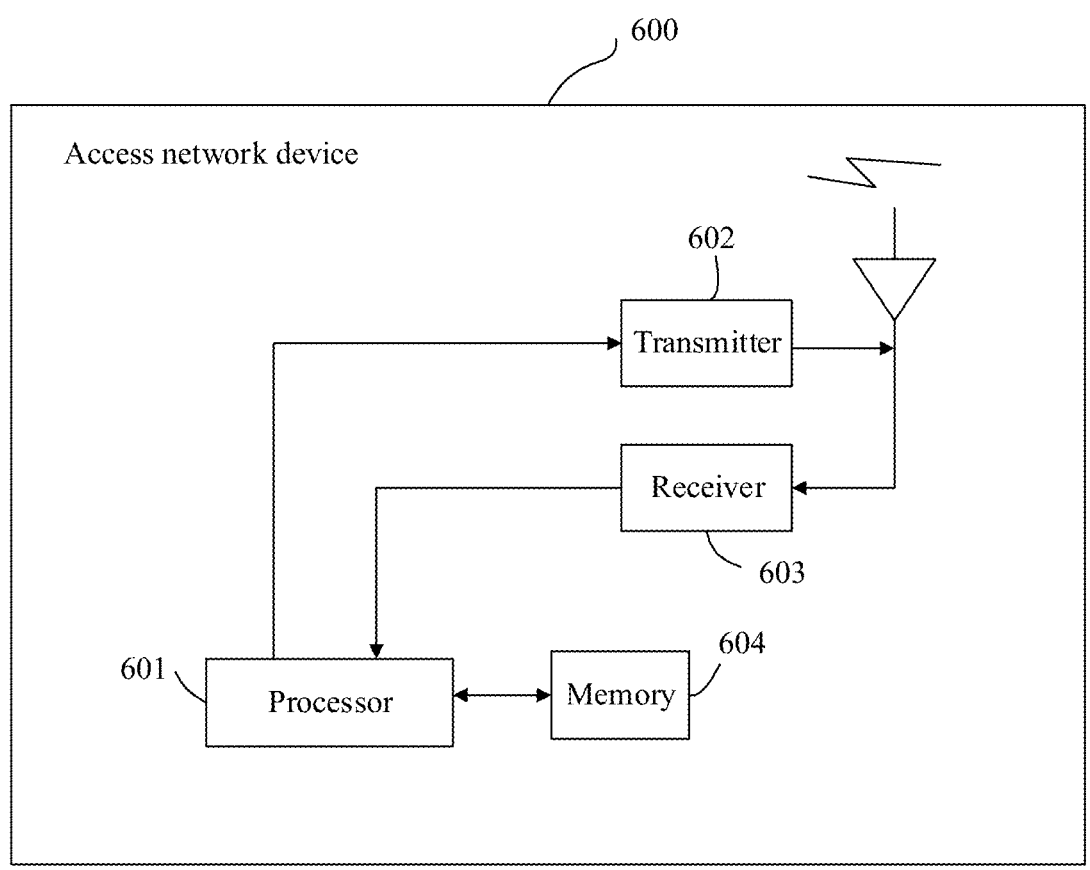
FIG. 6 is a schematic structural diagram of an access network device according to an embodiment.

FIG. 6 is a schematic structural diagram of an access network device according to an embodiment. The access network device 600 includes a processor 601 and a transmitter 602. The access network device further includes a memory 604 according to an actual requirement.

The processor 601 is configured to determine first configuration information of a first reference signal.

The transmitter 602 is configured to send an activation command to a terminal device, and the activation command is used to indicate activating a secondary cell.

The transmitter 602 is further configured to send the first configuration information of the first reference signal that is determined by the processor to the terminal device.

The transmitter 602 is further configured to send the first reference signal to the terminal device according to the first configuration information, and the first reference signal is used to obtain a channel measurement result of the secondary cell.

Optionally, the access network device further includes a receiver 603, and the receiver 603 is configured to receive the channel measurement result from the terminal device.

Specifically, the first reference signal is located before an available second reference signal of the terminal device in time domain, and the second reference signal is configured by using second configuration information; or the first reference signal is located between two adjacent second reference signals of the terminal device in time domain, and the two adjacent second reference signals are configured by using same second configuration information. Optionally, the second reference signal is periodic.

In an optional design, the first reference signal is a synchronization signal or a channel state information reference signal. For example, if the processor determines that the terminal device is not synchronized with the secondary cell, the reference signal is a synchronization signal; or if the processor determines that the terminal device is synchronized with the secondary cell, the reference signal is a channel state information reference signal.

In an optional design, the first configuration information is included in the activation command; or the first configuration information is sent before the activation command; or a first part of the first configuration information is included in the activation command, and a second part of the first configuration information is sent before the activation command.

In an optional design, before the transmitter sends the first reference signal to the terminal device according to the first configuration information, when the processor determines that a difference between the available second reference signal of the terminal device and a current time exceeds a first threshold, the processor determines that the first reference signal is sent to the terminal device, where the first threshold is preset.

Further, the first configuration information includes at least one of the following information:
a reference signal sending indication;
a reference signal sending time;
a reference signal period;
a reference signal time domain resource location;
a reference signal frequency domain resource location; and
a reference signal configuration index, where the reference signal configuration index is used to indicate a location of reference signal configuration information.

The reference signal sending time of the first reference signal is a relative time difference between a time at which the transmitter sends the first reference signal and a time at which the transmitter sends the activation command, or is a time at which the transmitter sends the first reference signal.

It should be noted that, for a specific implementation of performing the secondary cell activation method by the access network device 600, refer to the description of the secondary cell activation method provided in the foregoing embodiment of the present invention. The access network device 600 in this embodiment of the present invention and the secondary cell activation method corresponding to FIG. 3 are according to a same concept, and technical effects brought by the access network device 600 are the same as those brought by the foregoing resource scheduling method. Specific functions of the processor 601, the transmitter 602, the receiver 603, and the memory 604 that are included in the access network device in this embodiment, and any features, terms, and implementation details thereof correspond to functions of the access network device in the method embodiment corresponding to FIG. 3. For specific content, refer to the description of the method embodiment corresponding to FIG. 3 of the present invention. Details are not described herein again.

It should be noted that, in the foregoing embodiment, the access network device may be completely or partially implemented by software, hardware, firmware, or any combination thereof.

In an optional manner, a corresponding component in the foregoing embodiment may be implemented by corresponding hardware, or may be implemented by corresponding hardware by executing corresponding software. For example, the receiver 604 may be hardware that has the foregoing receiving function, for example, a transceiver that integrates receiving and sending functions or a receiver that implements only a receiving function, or may be a general processor or another hardware device that can execute a corresponding computer program to implement the foregoing function, or may be a software module or a functional unit that implements a corresponding function, for example, a receiving unit. For another example, the processor 601 may be hardware that has a processor function, for example, a processor having a specific function or a general processor, or may be another hardware device that can execute a corresponding computer program to implement the foregoing function, or may be a software module or a functional unit that implements a corresponding function, for example, a processing unit. For still another example, the transmitter 602 may be hardware that has the foregoing sending function, for example, a transceiver that integrates receiving and sending functions, or a transmitter that implements only a sending function, or may be a general processor or another hardware device that can execute a corresponding computer program to implement the foregoing function, or may be a software module or a functional unit that implements a corresponding function, for example, a sending unit.

Figure 7:
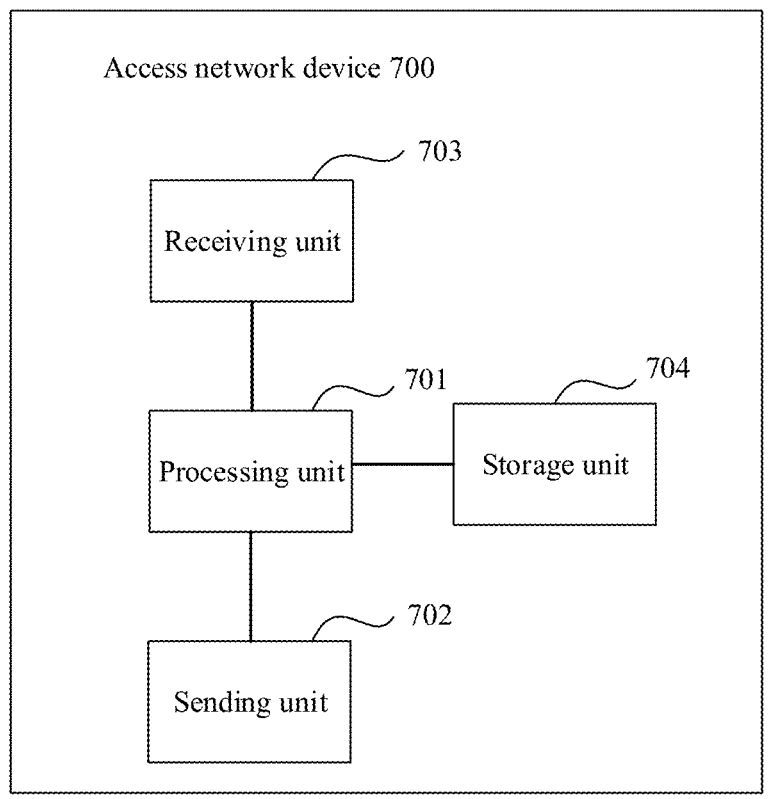
FIG. 7 is a schematic structural diagram of another access network device according to an embodiment.

FIG. 7 is a schematic structural diagram of another access network device according to an embodiment of the present invention. The access network device includes a processing unit 701 and a sending unit 702. The access network device further includes a storage unit 704 according to an actual requirement.

The processing unit 701 is configured to determine first configuration information of a first reference signal.

The sending unit 702 is configured to send an activation command to a terminal device, and the activation command is used to indicate activating a secondary cell.

The sending unit 702 is further configured to send the first configuration information of the first reference signal that is determined by the processing unit to the terminal device.

The sending unit 702 is further configured to send the first reference signal to the terminal device according to the first configuration information, and the first reference signal is used to obtain a channel measurement result of the secondary cell.

Optionally, the access network device further includes a receiving unit 703, and the receiving unit 703 is configured to receive the channel measurement result from the terminal device.

It should be noted that, for a specific implementation of performing the secondary cell activation method by the access network device 700, refer to the description of the secondary cell activation method provided in the foregoing embodiment of the present invention. The access network device 700 in this embodiment of the present invention and the secondary cell activation method corresponding to FIG. 3 are according to a same concept, and technical effects brought by the access network device 700 are the same as those brought by the foregoing resource scheduling method. Specific functions of the processing unit 701, the sending unit 702, the receiving unit 703, and the storage unit 704 that are included in the access network device in this embodiment, and any features, terms, and implementation details thereof correspond to functions of the access network device in the method embodiment corresponding to FIG. 3. For specific content, refer to the description of the method embodiment corresponding to FIG. 3 of the present invention. Details are not described herein again.

In another optional manner, when the access network device is implemented by software, the access network device may be completely or partially implemented in a form of a computer program product. The computer program product includes one or more computer instructions. When the computer program instructions are loaded or executed on a computer, some or all of the procedures or functions in the embodiments of the present invention are implemented. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center that integrates one or more usable media. The usable medium may be a magnetic medium (for example, a floppy disk, a hard disk, or a magnetic tape), an optical medium (for example, a digital video disk (DVD)), a semiconductor medium (for example, a solid state disk Solid State Disk (SSD)), or the like.

Figure 8:
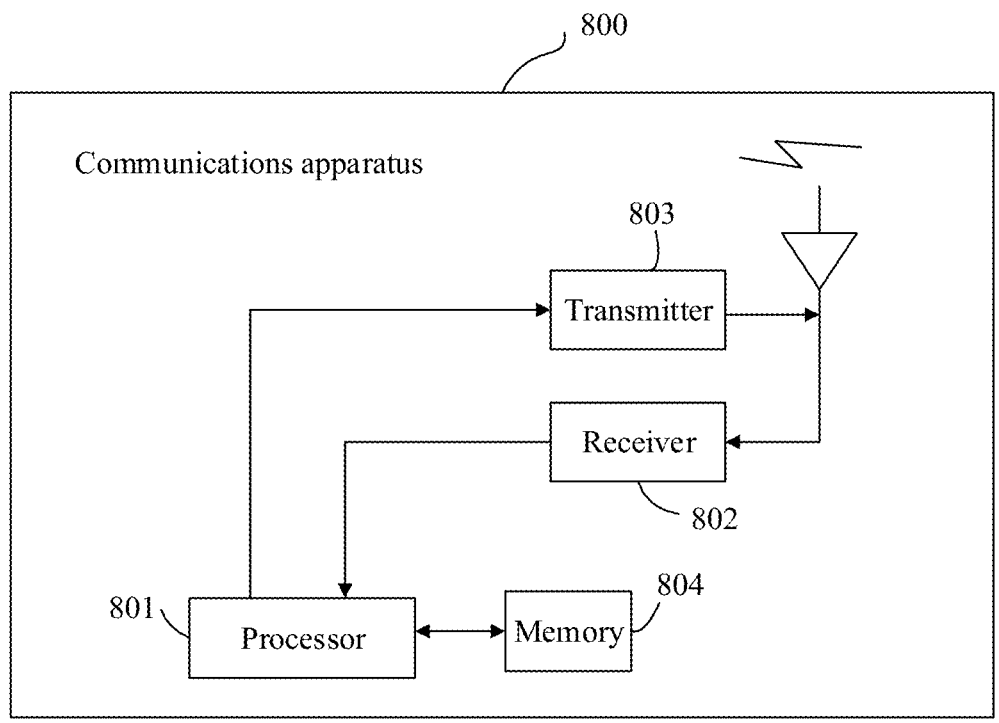
FIG. 8 is a schematic structural diagram of a communications apparatus according to an embodiment.

FIG. 8 is a schematic structural diagram of a communications apparatus according to an embodiment. The communications apparatus 800 may be a terminal device, or another hardware device, a functional module, a chip, or the like that can be configured to communicate with an access network device to implement a corresponding function. The communications apparatus includes a processor 801 and a receiver 802. The communications apparatus further includes a memory 804 according to an actual requirement.

The receiver 802 is configured to receive an activation command from an access network device, and the activation command is used to indicate activating a secondary cell.

The receiver 802 is further configured to: receive first configuration information of a first reference signal from the access network device, and receive the first reference signal according to the first configuration information.

The processor 801 is configured to obtain a channel measurement result of the secondary cell according to the first reference signal.

Optionally, the communications apparatus further includes a transmitter 803, and the transmitter is configured to send the channel measurement result to the access network device.

Specifically, the first reference signal is located before an available second reference signal of the terminal device in time domain, and the second reference signal is configured by using second configuration information; or the first reference signal is located between two adjacent second reference signals of the terminal device in time domain, and the two adjacent second reference signals are configured by using same second configuration information. Optionally, the second reference signal is periodic.

In an optional design, the first reference signal is a synchronization signal or a channel state information reference signal. For example, if the processor determines that the terminal device is not synchronized with the secondary cell, the reference signal is a synchronization signal; or if the processor determines that the terminal device is synchronized with the secondary cell, the reference signal is a channel state information reference signal.

In an optional design, the first configuration information is included in the activation command; or the first configuration information is sent before the activation command; or a first part of the first configuration information is included in the activation command, and a second part of the first configuration information is sent before the activation command.

Further, the first configuration information includes at least one of the following information:
- a reference signal sending indication;
- a reference signal sending time;
- a reference signal period;
- a reference signal time domain resource location;
- a reference signal frequency domain resource location; and
- a reference signal configuration index, where the reference signal configuration index is used to indicate a location of reference signal configuration information.

The reference signal sending time of the first reference signal is a relative time difference between a time at which the access network device sends the first reference signal and a time at which the access network device sends the activation command, or is a time at which the access network device sends the first reference signal.

It should be noted that, for a specific implementation of performing the secondary cell activation method by the communications apparatus 800, refer to the description of the secondary cell activation method provided in the foregoing embodiment of the present invention. The communications apparatus 800 in this embodiment of the present invention and the secondary cell activation method corresponding to FIG. 4 are according to a same concept, and technical effects brought by the communications apparatus 800 are the same as those brought by the foregoing resource scheduling method. Specific functions of the processor 801, the receiver 802, the transmitter 803, and the memory 804 that are included in the communication apparatus in this embodiment, and any features, terms, and implementation details thereof correspond to the functions of the terminal device in the method embodiment corresponding to FIG. 3. For specific content, refer to the description of the method embodiment corresponding to FIG. 3 of the present invention. Details are not described herein again.

It should be noted that, in the foregoing embodiment, the terminal device may be completely or partially implemented by software, hardware, firmware, or any combination thereof.

In an optional manner, a corresponding component in the foregoing embodiment may be implemented by corresponding hardware, or may be implemented by corresponding hardware by executing corresponding software. For example, the receiver 802 may be hardware that has the foregoing receiving function, for example, a transceiver that integrates receiving and sending functions or a receiver that implements only a receiving function, or may be a general processor or another hardware device that can execute a corresponding computer program to implement the foregoing function, or may be a software module or a functional unit that implements a corresponding function, for example, a receiving unit. For another example, the processor 801 may be hardware that has a processor function, for example, a processor having a specific function or a general processor, or may be another hardware device that can execute a corresponding computer program to implement the foregoing function, or may be a software module or a functional unit that implements a corresponding function, for example, a processing unit. For still another example, the transmitter 803 may be hardware that has the foregoing sending function, for example, a transceiver that integrates receiving and sending functions, or a transmitter that implements only a sending function, or may be a general processor or another hardware device that can execute a corresponding computer program to implement the foregoing function, or may be a software module or a functional unit that implements a corresponding function, for example, a sending unit.

Figure 9:
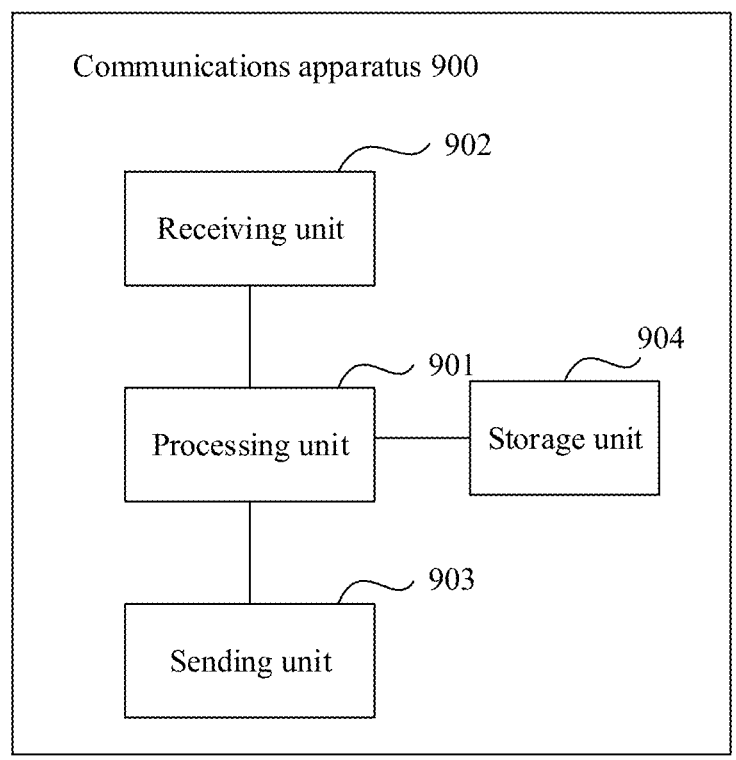
FIG. 9 is a schematic structural diagram of another communications apparatus according to an embodiment.

FIG. 9 is a structural diagram of another communications apparatus 900 according to an embodiment of the present invention. The communications apparatus includes a processing unit 901 and a receiving unit 902. The access network device further includes a storage unit 904 according to an actual requirement.

The receiving unit 902 is configured to receive an activation command from an access network device, and the activation command is used to indicate activating a secondary cell.

The receiving unit 902 is further configured to: receive first configuration information of a first reference signal from the access network device, and receive the first reference signal according to the first configuration information.

The processing unit 901 is configured to obtain a channel measurement result of the secondary cell according to the first reference signal.

Optionally, the communications apparatus further includes a sending unit 903, and the sending unit 903 is configured to send the channel measurement result to the access network device.

Specifically, the first reference signal is located before an available second reference signal of the terminal device in time domain, and the second reference signal is configured by using second configuration information; or the first reference signal is located between two adjacent second reference signals of the terminal device in time domain, and the two adjacent second reference signals are configured by using same second configuration information. Optionally, the second reference signal is periodic.

It should be noted that, for a specific implementation of performing the secondary cell activation method by the communications apparatus 900, refer to the description of the secondary cell activation method provided in the foregoing embodiment of the present invention. The communications apparatus 900 in this embodiment of the present invention and the secondary cell activation method corresponding to FIG. 4 are according to a same concept, and technical effects brought by the communications apparatus 900 are the same as those brought by the foregoing resource scheduling method. Specific functions of the processing unit 901, the receiving unit 902, the sending unit 903, and the storage unit 904 that are included in the communications apparatus in this embodiment, and any features, terms, and implementation details thereof correspond to functions of the terminal device in the method embodiment corresponding to FIG. 3. For specific content, refer to the description of the method embodiment corresponding to FIG. 3 of the present invention. Details are not described herein again.

In another optional manner, when the communications apparatus is implemented by software, the communications apparatus may be completely or partially implemented in a form of a computer program product. The computer program product includes one or more computer instructions. When the computer program instructions are loaded or executed on a computer, some or all of the procedures or functions in the embodiments of the present invention are implemented. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center that integrates one or more usable media. The usable medium may be a magnetic medium (for example, a floppy disk, a hard disk, or a magnetic tape), an optical medium (for example, a digital video disk (DVD)), a semiconductor medium (for example, a solid state disk Solid State Disk (SSD)), or the like.

It should be noted that the processor included in the access network device or the communications apparatus configured to perform the secondary cell activation method provided in the embodiments of the present invention may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in the present invention. The processor may alternatively be a combination of processors implementing a computing function, for example, a combination of one or more microprocessors, or a combination of the DSP and a microprocessor.

Method or algorithm steps described in combination with the embodiments of the present invention may be implemented by hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable magnetic disk, a CD-ROM, or a storage medium of any other form known in the art. An example storage medium is coupled to a processor, so that the processor can read information from the storage medium and write information into the storage medium. Certainly, the storage medium may be a component of the processor. The processor and the storage medium may be located in an ASIC. In addition, the ASIC may be located in a terminal device. Certainly, the processor and the storage medium may alternatively exist in the terminal device as discrete components.

It may be understood that FIG. 6 to FIG. 9 merely show a simplified design of the access network device or the communications apparatus. In actual application, the access network device or the communications apparatus may include any quantity of transmitters, receivers, processors, controllers, memories, communications units, and the like.

An embodiment of the present invention further provides a communications system, including at least one access network device and at least one communications apparatus for executing the embodiments of the present invention.

It should be understood that "an embodiment", "one embodiment", or "this embodiment of the present invention" mentioned in the entire specification means that particular features, structures, or characteristics related to the embodiment are included in at least one embodiment of the present invention. Therefore, "in an embodiment", "in one embodiment", or "in this embodiment of the present invention" appearing throughout the specification does not necessarily refer to a same embodiment. In addition, these particular features, structures, or characteristics may be combined in one or more embodiments in any appropriate manner.

It should be understood that sequence numbers of the foregoing processes do not mean an execution sequence in the embodiments of the present invention. The execution sequence of the processes should be determined according to functions and internal logic of the processes, and should not be construed as any limitation on the implementation processes of the embodiments of the present invention.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made according to the technical solutions of the present invention shall fall within the protection scope of the present invention.

The solutions provided in the embodiments of the present invention are mainly described above from a perspective of interaction between network elements. It can be understood that, to implement the foregoing functions, the network elements such as the communications apparatus and the radio access network device include a corresponding hardware structure and/or software module for performing each of the functions. A person skilled in the art should easily be aware that, in combination with the examples described in the embodiments disclosed in this specification, units, and algorithm steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A secondary cell activation method, comprising:
sending, by an access network device to a terminal device, an activation command for activating a secondary cell;
sending, by the access network device to the terminal device, first configuration information of a first reference signal, wherein the first reference signal is a temporary reference signal for activating the secondary cell;
sending, by the access network device to the terminal device, the first reference signal, and
wherein the first configuration information comprises a reference signal sending time, wherein the reference signal sending time of the first reference signal is a relative time difference between a time at which the access network device sends the first reference signal and a time at which the access network device sends the activation command, or is a time at which the access network device sends the first reference signal, and wherein the first configuration information further comprises at least one of the following information:

a reference signal sending indication,
a reference signal period,
a reference signal time domain resource location,
a reference signal frequency domain resource location, and
a reference signal configuration index, wherein the reference signal configuration index indicates a location of reference signal configuration information.

2. The method according to claim 1, wherein the first reference signal is located before an available second reference signal of the terminal device in a time domain, and the second reference signal is configured using second configuration information; or
the first reference signal is located between two adjacent second reference signals of the terminal device in the time domain, and the two adjacent second reference signals are configured using same second configuration information.

3. The method according to claim 1, wherein the first configuration information is sent by Media Access Control Control Element (MAC CE).

4. A secondary cell activation method, comprising:
receiving, by a terminal device from an access network device, an activation command that indicates activating a secondary cell; and
receiving, by the terminal device, first configuration information of a first reference signal, wherein the first reference signal is a temporary reference signal for activating the secondary cell;
receiving, by the terminal device, the first reference signal according to the first configuration information, wherein the first configuration information comprises a reference signal sending time, wherein the reference signal sending time of the first reference signal is a time difference between a time at which the access network device sends the first reference signal and a time at which the access network device sends the activation command, or is a time at which the access network device sends the first reference signal, and wherein the first configuration information further comprises at least one of the following information:
a reference signal sending indication,
a reference signal period,
a reference signal time domain resource location,
a reference signal frequency domain resource location, and
a reference signal configuration index, wherein the reference signal configuration index indicates a location of reference signal configuration information.

5. The method according to claim 4, wherein the first reference signal is located before an available second reference signal of the terminal device in a time domain, and the second reference signal is configured using second configuration information; or
the first reference signal is located between two adjacent second reference signals of the terminal device in the time domain, and the two adjacent second reference signals are configured using same second configuration information.

6. An apparatus, comprising:
one or more processors; and
a non-transitory storage medium storing program instructions, which when executed by the one or more processors, the program instructions cause the apparatus to perform a method that comprises:
sending an activation command to a terminal device, wherein the activation command for activating a secondary cell,
sending first configuration information of a first reference signal to the terminal device, wherein the first reference signal is a temporary reference signal for activating the secondary cell,
sending the first reference signal to the terminal device, and
wherein the first configuration information comprises a reference signal sending time, wherein the reference signal sending time of the first reference signal is a relative time difference between a time at which the one or more processors send the first reference signal and a time at which the one or more processors send the activation command, or is a time at which the one or more processors send the first reference signal, and wherein the first configuration information further comprises at least one of the following information:
a reference signal sending indication,
a reference signal period,
a reference signal time domain resource location,
a reference signal frequency domain resource location, and
a reference signal configuration index, wherein the reference signal configuration index indicates a location of reference signal configuration information.

7. The apparatus according to claim 6, wherein the first reference signal is located before an available second reference signal of the terminal device in a time domain, and the second reference signal is configured using second configuration information; or
the first reference signal is located between two adjacent second reference signals of the terminal device in the time domain, and the two adjacent second reference signals are configured using same second configuration information.

8. The apparatus according to claim 6, wherein the first configuration information is sent by Media Access Control Control Element (MAC CE).

9. An apparatus, comprising:
one or more processors; and
a non-transitory storage medium storing program instructions, which when executed by the one or more processors, the program instructions cause the apparatus to perform a method that comprises:
receiving an activation command from an access network device that indicates activating a secondary cell,
receiving first configuration information of a first reference signal, wherein the first reference signal is a temporary reference signal for activating the secondary cell, and
receiving the first reference signal according to the first configuration information, wherein the first configuration information comprises a reference signal sending time, wherein the reference signal sending time of the first reference signal is a time difference between a time at which the access network device sends the first reference signal and a time at which the access network device sends the activation command, or is a time at which the access network device sends the first reference signal, and wherein the first configuration information further comprises at least one of the following information:

a reference signal sending indication,
a reference signal period,
a reference signal time domain resource location,
a reference signal frequency domain resource location, and
a reference signal configuration index, wherein the reference signal configuration index indicates a location of reference signal configuration information.

10. The apparatus according to claim 9, wherein the first reference signal is located before an available second reference signal of the apparatus in a time domain, and the second reference signal is configured using second configuration information; or
the first reference signal is located between two adjacent second reference signals of the apparatus in the time domain, and the two adjacent second reference signals are configured using same second configuration information.

11. The apparatus according to claim 9, wherein the first configuration information is sent by Media Access Control Control Element (MAC CE).

12. The method according to claim 1, wherein:
the activation command comprises the first configuration information; or
the access network device sends the first configuration information before the activation command; or
the activation command comprises a first part of the first configuration information, and
the access network device sends a second part of the first configuration information before the activation command.

13. The method according to claim 4, wherein:
the activation command comprises the first configuration information; or
the access network device sends the first configuration information before the activation command; or
the activation command comprises a first part of the first configuration information, and
the access network device sends a second part of the first configuration information before the activation command.

14. The apparatus according to claim 6, wherein:
the activation command comprises the first configuration information; or the apparatus sends the first configuration information before the activation command; or
the activation command comprises a first part of the first configuration information, and the apparatus sends a second part of the first configuration information before the activation command.

15. The apparatus according to claim 9, wherein:
the activation command comprises the first configuration information; or
the access network device sends the first configuration information before the activation command; or
the activation command comprises a first part of the first configuration information, and the access network device sends a second part of the first configuration information before the activation command.

* * * * *